United States Patent
Hua et al.

(10) Patent No.: US 8,195,598 B2
(45) Date of Patent: Jun. 5, 2012

(54) METHOD OF AND SYSTEM FOR HIERARCHICAL HUMAN/CROWD BEHAVIOR DETECTION

(75) Inventors: Wei Hua, Cupertino, CA (US);
Xiangrong Chen, Fremont, CA (US);
Ryan Crabb, Los Gatos, CA (US);
Juwei Lu, San Jose, CA (US); Jonathan Cook, Los Gatos, CA (US)

(73) Assignee: Agilence, Inc., Camden, NJ (US)

( * ) Notice: Subject to any disclaimer, the term of this patent is extended or adjusted under 35 U.S.C. 154(b) by 785 days.

(21) Appl. No.: 12/313,193

(22) Filed: Nov. 17, 2008

(65) Prior Publication Data

US 2009/0222388 A1    Sep. 3, 2009

Related U.S. Application Data

(60) Provisional application No. 61/003,339, filed on Nov. 16, 2007.

(51) Int. Cl.
*G06F 15/00* (2006.01)
*G06F 15/18* (2006.01)

(52) U.S. Cl. .............. 706/62; 706/45; 706/47; 382/100; 382/103; 382/107

(58) Field of Classification Search ........................ None
See application file for complete search history.

(56) References Cited

U.S. PATENT DOCUMENTS

| | | | |
|---|---|---|---|
| 5,940,538 A | 8/1999 | Spiegel et al. | 382/236 |
| 2002/0049690 A1* | 4/2002 | Takano | 706/47 |
| 2004/0113933 A1* | 6/2004 | Guler | 345/716 |
| 2006/0176951 A1 | 8/2006 | Berman et al. | 375/240.01 |
| 2006/0179463 A1 | 8/2006 | Chisholm et al. | 725/90 |
| 2007/0003141 A1* | 1/2007 | Rittscher et al. | 382/181 |
| 2007/0121999 A1* | 5/2007 | Ma et al. | 382/103 |
| 2007/0122003 A1* | 5/2007 | Dobkin et al. | 382/115 |
| 2007/0263900 A1* | 11/2007 | Medasani et al. | 382/103 |

OTHER PUBLICATIONS

Cupillard et al. "Behavior recognition for individuals, groups of people and crowd", IEEE Symposium on Intelligence distributed surveillance systems, 2003, 5 pages.*
Bremond et al. "Video-understanding framework for automatic behavior recognition", Behavior Research Methods, 2003, pp. 416-426.*
Wu, Xinyu Liang, Guoyuan Lee, Ka Keung Xu, Yangsheng, "Crowd Density Estimation Using Texture Analysis and Learning", IEEE International Conference on ROBIO 2006, pp. 214-219.
N. Paragios, V. Ramesh. "A MRF-Based Approach for Real-Time Subway Monitoring," CVPR, vol. 01, No. 1, p. 1034, 2001.

(Continued)

*Primary Examiner* — Omar Fernandez Rivas
(74) *Attorney, Agent, or Firm* — Kauth, Pomeroy, Peck & Bailey LLP

(57) ABSTRACT

The present invention is directed to a computer automated method of selectively identifying a user specified behavior of a crowd. The method comprises receiving video data but can also include audio data and sensor data. The video data contains images a crowd. The video data is processed to extract hierarchical human and crowd features. The detected crowd features are processed to detect a selectable crowd behavior. The selected crowd behavior detected is specified by a configurable behavior rule. Human detection is provided by a hybrid human detector algorithm which can include Adaboost or convolutional neural network. Crowd features are detected using textual analysis techniques. The configurable crowd behavior for detection can be defined by crowd behavioral language.

13 Claims, 13 Drawing Sheets

OTHER PUBLICATIONS

J.C. Platt, "Probabilistic Outputs for Support Vector Machines and Comparisons to Regularized Likelihood Methods", in Advances in Large Margin Classifiers, A. Smola, P. Bartlett, B. Schölkopf, D. Schuurmans, eds., pp. 61-74, MIT Press, (1999).

S. R. Musse and D. Thalmann, "Hierarchical model for real time simulation of virtual human crowds", IEEE Transactions on Visualization and Computer Graphics, vol. 7, No. 2, Apr.-Jun. 2001, pp. 152-164.

S.-Y. Cho, T. S. Chow, "A Fast Neural Learning Vision System for Crowd Estimation at Underground Stations Platform", Neural Processing Letters 10: 111-120, 1999.

B. Lucas and T. Kanade, "An iterative image registration technique with an application to stereo vision". In Proceedings of Imaging understanding workshop, pp. 121-130, 1981.

Hoiem, et al., "Putting Objects in Perspective", IEEE International Conference on Computer Vision and Pattern Recognition (CVPR), 2006., 2137-2144.

Koller, et al., "Robust Multiple Car Tracking with Occlusion Reasoning", in European Conf. on Computer Vision 1994., 189-196.

Nguyen, et al., "Crowd Behavior Cognitive Model Architecture Design", Proceedings of the 2005 Conference on Behavior Representation in Modeling and Simulation, May 16-19 2005., 55-64.

Oliver, et al., "A Bayesian Computer Vision System for Modeling Human Interactions", IEEE Transactions on Pattern Analysis and Machine Intelligence, vol. 22, Issue 8 (Aug. 2000), 831-843.

Reisman, et al., "Crowd Detection in Video Sequences", IEEE Intelligent Vehicles Symposium 2004, 66-71.

Stauffer, et al., "Adaptive Background Mixture Models for Real-Time Tracking", Computer Vision and Pattern Recognition, 1999., 246-252.

Sun, et al., "Background Cut", in European Conference on Computer Vision 2006, 628-641.

* cited by examiner

METHOD OF AND SYSTEM FOR HIERARCHICAL HUMAN/CROWD BEHAVIOR DETECTION

RELATED APPLICATIONS

This application is a utility patent application which claims priority under 35 U.S.C. §119(e) of the co-pending, co-owned U.S. Provisional Patent Application Ser. No. 61/003,339, filed Nov. 16, 2007, and entitled "METHOD AND APPARATUS FOR DESCRIPTIVE AND HIERARCHICAL HUMAN/CROWD BEHAVIOR DETECTION" The Provisional Patent Application Ser. No. 61/003,339 filed Nov. 16, 2007, and entitled "METHOD AND APPARATUS FOR DESCRIPTIVE AND HIERARCHICAL HUMAN/CROWD BEHAVIOR DETECTION" is also hereby incorporated by reference in its entirety.

FIELD OF THE INVENTION

The invention relates to a method of and system for computer automated hierarchical human and crowd characterization and crowd behavioral detection using a video, audio, and a variety of environmental sensors and external information for use with in security monitoring and crowd management.

BACKGROUND OF THE INVENTION

Automatically detecting the formation and presence of a crowd and understanding its behavior are important to many applications in military, security, and commercial environments. It is stated in the Proceedings of the 2005 Conference on Behavior Representation in Modeling and Simulation "All military operations, large or small, have a crowd control/crowd confusion factor. Crowds are one of the worst situations you can encounter. There is mass confusion; loss of control and communication with subordinates; potential for shooting innocent civilians, or being shot at by hostiles in the crowd; potential for an incident at the tactical level to influence operations and policy at the strategic level."

While some investigations into sensors that are effective in estimating crowds, (e.g., radar) have been conducted, traditional video-based surveillance combined with computer vision techniques are often used to address the problem. Video surveillance systems are currently the most promising and widely used technique to model and monitor crowds. Surveillance cameras are low cost due to the economies of scale from the security industry, portable, and passive and require no physical contact with the subject being monitored.

Accurate crowd modeling is a challenging problem because environments and groups of people vary and are unpredictable. Many efforts have been conducted to detect crowds using video input. Those approaches have focused on modeling background scenes and extracting foreground objects in order to estimate crowd locations and density. However, a background modeling approach has been proven to be less than reliable for modeling lighting, weather, and camera-related changes. Therefore, the type of foreground object of interest is usually limited, especially for crowd modeling, where humans are of interest. Human objects have unique characteristics regardless of environment. Information theory also states that the more information collected, the better the decision that can be made. Good examples of this theory is found in the recent work of Hoiem and Efros that provides a good example of this theory as stated by the article D. Hoiem, A. A. Efros, and M. Hebert, "Putting Objects in Perspective", in IEEE International Conference on Computer Vision and Pattern Recognition (CVPR), 2006.

When considering human crowd monitoring, current state of the art intelligent video surveillance systems are primarily concentrated on crowd detection. A successful system that interprets crowd behavior has not been developed. On the other hand, crowd behavior has been studied in-depth in psychology. Information about crowd behavior can be found in books and articles. Examples include, Turner, Ralph, and Lewis M. Killian. *Collective Behavior* 2d ed. Englewood Cliffs, N.J.: Prentice Hall, 1972; 3d ed., 1987; 4th ed., 1993; Rheingold, Howard, *Smart Mobs: The Next Social Revolution*, 2003; Mc Phail, Clark, *The Myth of the Madding Crowd*, New York, Aldine de Gruyter, 1991; Canetti, Elias (1960). Crowds and Power. Viking Adult. ISBN 0670249998.

Musse and Thalmann propose a hierarchical crowd model. A description of this model is found in, S. R. Musse and D. Thalmann, "Hierarchical model for real time simulation of virtual human crowds", IEEE Transactions on Visualization and Computer Graphics, Vol. 7, No. 2, April-June 2001, pp. 152-164 which is incorporated by reference. According to their model, a crowd is made up of groups and groups are made up of individuals. A crowd's behavior can be understood and anticipated through understanding the group's behavior and in turn the inter-group relationships. Nguyen and McKenzie set up a crowd behavior model by integrating a cognitive model and a physical model, see Q. H. Nguyen, F. D. McKenzie, and M. D. Petty, "Crowd Behavior Cognitive Model Architecture Design", *Proceedings of the* 2005 *Conference on Behavior Representation in Modeling and Simulation*, Universal City Calif., May 16-19, 2005. The cognitive model models the "mind" for the crowd. The model receives stimuli from the physical model, processes the stimuli, and selects a behavior to send back to the physical model to carry out. Therefore, the physical model acts as the "body" of the crowd and is responsible for accepting behaviors as input, carrying out those behaviors, and then outputting stimuli to the cognitive model. A crowd is characterized by its size, mood, leadership structure, demographics, and propensity for violence. Nguyen and McKenzie used a crowd aggression level to characterize the state of the crowd. FIG. 10 shows a simplified behavior model as described by Nguyen and McKenzie.

While detecting and estimating the crowd is a difficult problem, understanding and detecting the crowd behavior and crowd mood is similarly challenging. The user of the system usually does not want to have a fixed behavior system, such as over-crowd detection, long waiting line detection, or people loitering detection. Although, this sounds straightforward, current implemented systems are always fixed for certain behaviors, or a set of behaviors. Each crowd behavior or crowd mood detection uses different algorithms, which makes it impossible for combining the behaviors into new behaviors. What is needed is a configurable system that provides the capability of a user to define the type of crowd behavior to be detected. The ability to let a user define behaviors in different levels of details provides tremendous flexibility and accuracy in detection. Further, what is needed is a processing method that provides accurate and computationally efficient crowd behavior detection while being able to handle wide variations in crowds and lighting environments.

SUMMARY OF THE INVENTION

A first aspect of the present invention, is for a computer automated method of selectively identifying a crowd behavior, a crowd mood, or a combination thereof is claimed. The method includes receiving video data. The video data contains images of one or more people forming a crowd. The video data is processed to detect hierarchical human and crowd features. The detected crowd features are processed to detect a selectable crowd behavior. The selectable crowd behavior for detection is specified by one or more configurable behavior rules.

In one embodiment, the method of selectively identifying a crowd behavior further comprises receiving audio data. The audio data corresponds to the environment from which the video data was taken. The audio data is processed to detect audio characteristics. These audio characteristics are used in the identification of a crowd behavior.

In a further embodiment, the method further comprises receiving sensor and external data. The sensor data includes at least one of a GPS location, weather, date, and time data. The external information includes schedule information, state of the environment such as the presence of a train. The sensor data is used for ground plane calibration. The weather data can be used to predict noise, lighting changes, and expected crowd behavior. For example, the presence of a crowd could be an indication of a problem. The presence of a group within a park on a sunny data might be normal but the presence of a crowd on a rainy data could be an indication of an injured person. Further, on a rainy day, the mood of the people can be different, and further there could be more people running to avoid the rain. The external data comprises environment state information that can include the presence of a train at the platform of a train or subway station, the presence of airplane at a terminal gate, the state of traffic lights, a security treat level indicator, or a combination thereof. The ground plane data is used to extract foreground features. The foreground features are used to generate a hierarchy of human and crowd features. Each level of the hierarchy can contain more details about a crowd. For example, the crowd could contain sub-crowds. Within a sub-crowd could be the a feature identification of a queue of people. As a further part of the hierarchy could contain information about the queue wait time and queue length. Further, the sensor data can be used in the audio processing. Location data can be used to characterize the background noise and the types of expected noise including car horns, airplane, and train sounds found at locations including train stations, airports, and street corners.

In another embodiment, the rules for detection of a crowd behavior are defined by a behavior description language, a graphical tool, or a combination of the two techniques.

The processing of the crowd video data and audio data generates hierarchical feature data. The feature data can include crowd features including crowd level features, crowd components, individual person features, and audio features. The generation of these features, in one embodiment includes generating a multiple reference image background model using day night detection and ground plane calibration. Additionally, an embodiment of generating crowd level features includes at least one of a hybrid human detector comprising a multiple learning based human detector using an interleaving scanning method, texture analysis, using Bayesian fusion and thereby generating improved crowd features, and optical flow analysis for the crowd dynamics and motion features. These processing techniques provide accurate human localization and crowd density estimations.

In another embodiment, the method of detecting crowd behavior includes a hybrid human detector comprising multiple learning based human detector. The human detector comprises at least one of an Adaboost algorithm, a convolutional neural network, or a combination thereof. The Adaboost or convolutional algorithm comprises of at least one of a human head detector, a upper body detector, a full body detector, or any combination of the detectors.

In a further embodiment of the method, the individual people feature data includes one or more of coarse level feature data, multiple hypothesis tracking data thereby generating tracking results comprised of people tracking data, multiple hypothesis tracking data, or any combination thereof. The tracking results are used to get bidirectional count and speed features for user defined counting lines. Counting lines are a defined as a reference line within a video frame that can be the beginning or end of a queue, or at any other point where the flow of individuals or crowds are of interest. Further a counting line can be used to gather statistics on the usage of an area within a video scene. This can include people entering a train station, using a phone booth, a restroom, or using an ATM machine.

Further, the detected behavior results can be used to form a response. The response can include controlling hardware such as a camera to change resolution or field of view of a camera, digital or mechanical zooming, and generating a human perceivable indication of the detected behavior or mood such as an alarm, video image of the scene, digital zooming on an area in which a behavior was identified, or a combination thereof. Further the response can display the path of one or more identified persons over time or a video monitor. The path can be displayed by drawing a line of the path followed by a person's head, shoulders, or other body parts.

In a second aspect of the present invention, one or more processor readable storage devices includes processor readable code embodied on the processor readable devices for programming one or more processors to perform a method of selective detection of a crowd behavior or mood. The processor readable code is configured to executed the steps of receiving video data of a crowd, generating hierarchical human and crowd feature data from the video data, and selectively identifying a behavior of the crowd by processing the hierarchical human and crowd feature data according to a behavior rule wherein the processing is configured to select a crowd behavior.

The readable storage devices, configured for crowd behavior detection, mood detection, or combination thereof, can be configured to perform the steps of receiving audio data corresponding to an environment associated with and produced by the crowd. The audio data is processed to identify audio characteristics which are used in the selective identification of crowd behaviors.

In a further embodiment, the readable storage devices are further configured to perform the steps of receiving sensor data wherein the sensor data is at least one of a GPS data, weather, date, and time data. External data include one or more of a schedules, the presence of a train at the platform of a train or subway station, the presence of airplane at a terminal gate, the state of traffic lights, a security threat level indicator, or a combination thereof. Further, the processor readable code on the readable storage devices is configured to generate hierarchical human and crowd feature data from the video data includes processing the sensor data.

Another aspect of the invention is for a computer processor automated method of characterizing a queue of people. The method includes the steps of receiving video data containing a queue of people. The received video images comprises three regions; a queue entrance region, a queue exit region, and a queue region of interest. From the queue region of interest, crowd features are extracted. From the queue entrance region first human features are generated. These features include identifying, counting, and time-stamping when a person passes through this region. From the queue exit region, second human features are identified. These features include identifying a person exiting the queue, counting the people, time-stamping when they exit. It can also detect a person traveling in the wrong direction through the queue. From the detected features, processing is performed to determine an estimated queue length, a queue speed, and a queue wait-time.

BRIEF DESCRIPTION OF THE DRAWINGS

The invention is better understood by reading the following detailed description of an exemplary embodiment in conjunction with the accompanying drawings.

DETAILED DESCRIPTION OF THE INVENTION

The following description of the invention is provided as an enabling teaching of the invention in its best, currently known embodiment. Those skilled in the relevant art will recognize that many changes can be made to the embodiment described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptions to the present inventions are possible and may even be desirable in certain circumstances, and are a part of the present invention. Thus, the following description is provided as illustrative of the principles of the present invention and not in limitation thereof, since the scope of the present invention is defined by the claims.

The embodiments of the invention disclosed within the figures are directed at detecting specified behaviors of either a single individual/human or a crowd of people that can include groups of people that form sub-crowds within a crowd. Further, the use of the term crowd within the specification is intended to refer to any number of people including a single person.

Figure 1A:
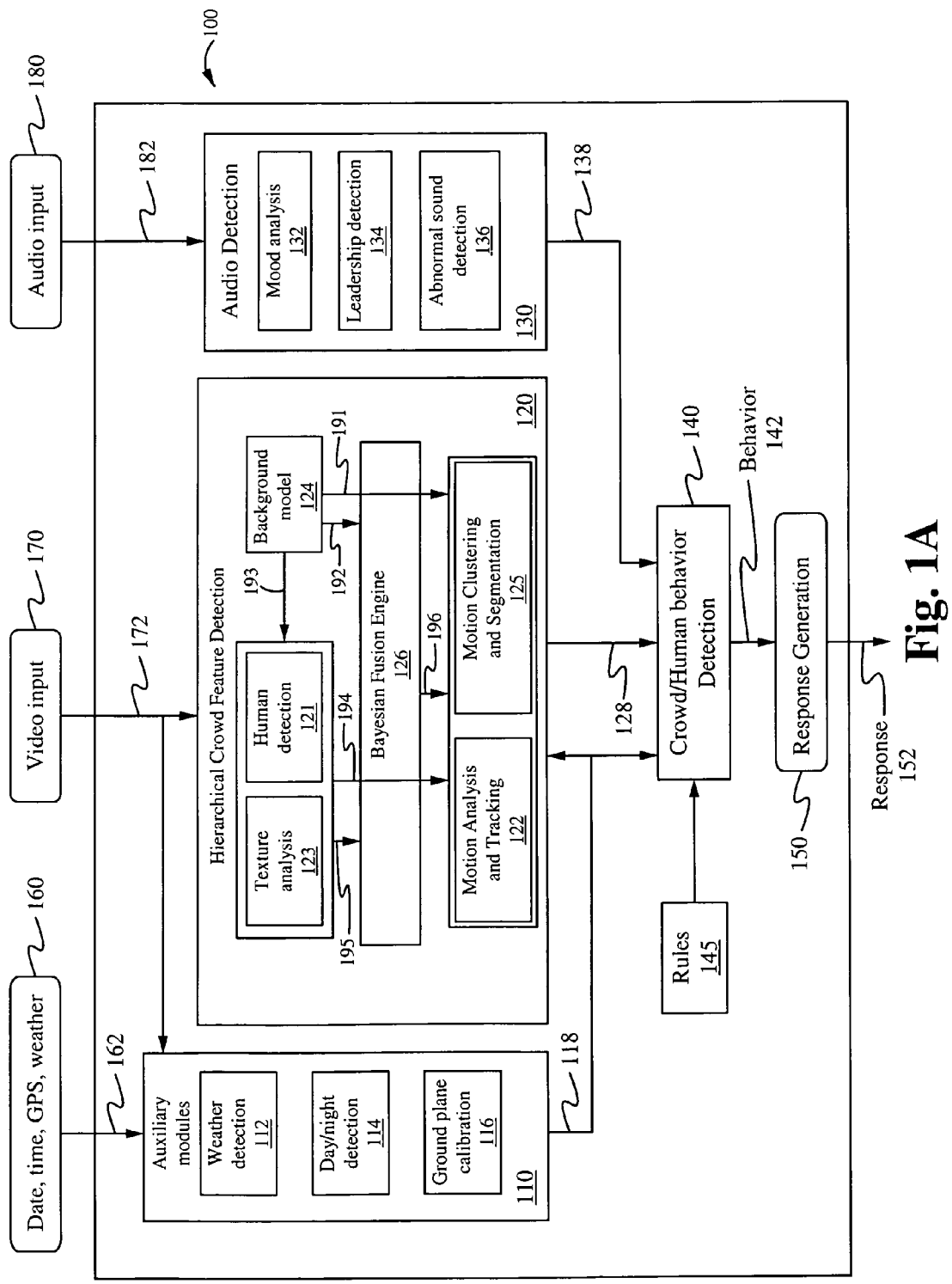
FIG. 1A illustrates functional block diagram showing one embodiment of processing organization and data flow.
Figure 1B:
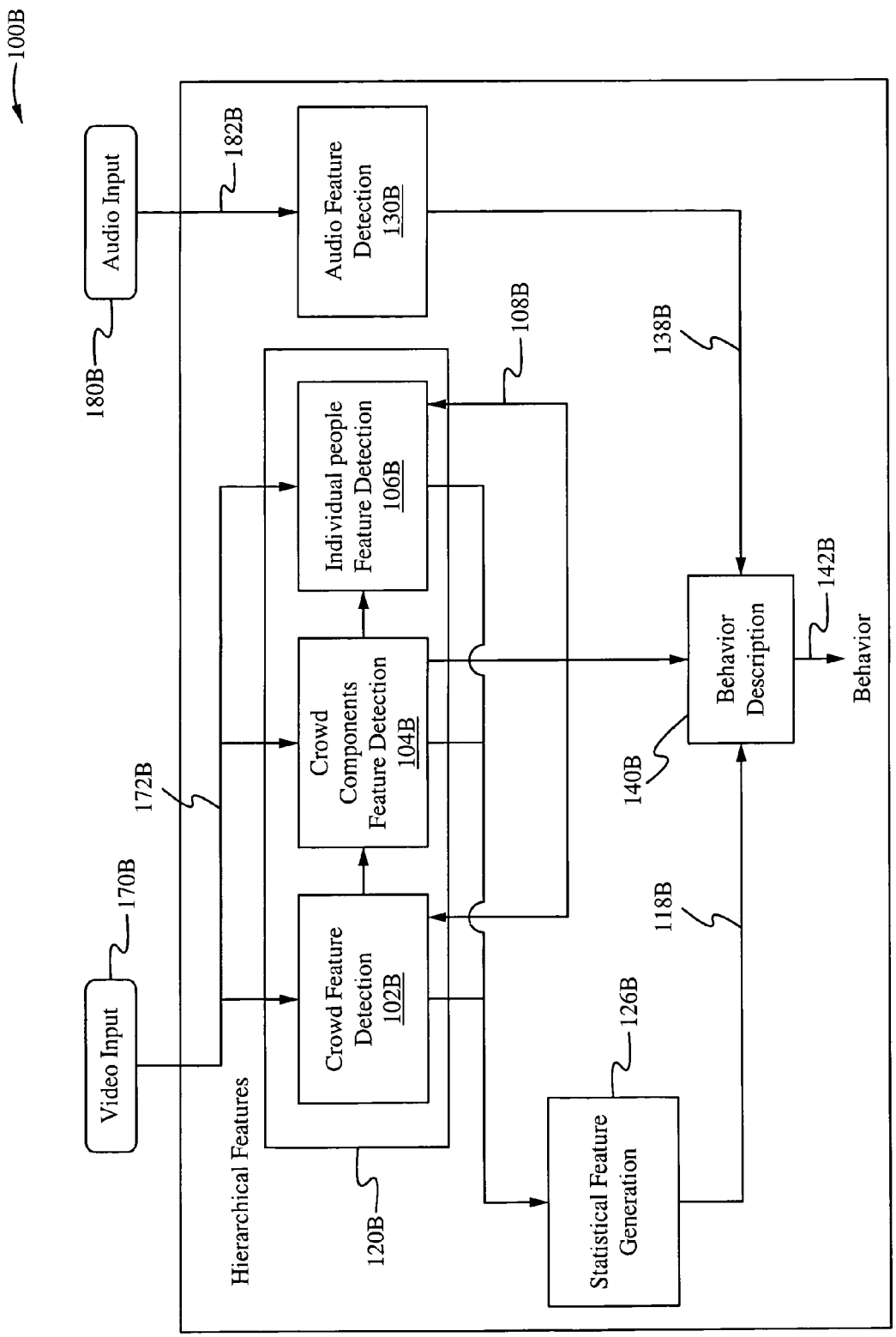
FIG. 1B illustrates a high level functional block showing one embodiment of the processing elements according to the present invention.

FIG. 1B illustrates a high level component diagram 100B of one embodiment of the invention. This diagram shows the Hierarchical Feature Detection 120B, Statistical Feature Generation 126B and Audio Feature Detection 130B modules and the Behavior Description module 142B. Hierarchical Features 120B is further composed of Crowd Feature Detection 102B, Crowd Sub-group Feature Detection 104B and Individual People Feature Detection 106B. As illustrated in the diagram, the output of 102B, 104B and 106B can be used to create Statistical features. The output 108B from hierarchical features, the output 138B from Audio Feature detection and the output 118B from the Statistical Feature detection 126 are used by the Behavior Description module 140B to create behavior rules 142B. The Statistical Feature Generation module 126B can use Bayesian Fusion techniques to statistically optimize the detected crowd features.

FIG. 1A illustrates a functional block diagram of one embodiment of the invention. A system 100 comprises processing modules which analyze video data, audio data, sensor data, external data or a combination thereof for selectable detection of crowd behaviors. The detected behavior 142 is determined by rules 145 that can be specified by a behavior description language. The detected crowd behaviors and moods are determined from hierarchal crowd feature data. The system can include a video interface 170, a auxiliary data interface 160, and an audio interface 180. The system can perform crowd behavior and mood detection with only video data 172 but can also utilize sensor and external data 162, and audio data 182, or any combination thereof in the detection, characterization, prediction or modeling of crowd behavior. The sensor data 160 can include weather, date, time, GPS location data, or a combination thereof. The external information can include but is not limited to schedule information, the presence of a train or plane, the state of a stoplight, a threat level, or a combination thereof. Utilizing wired, wireless communication, human input or a combination thereof, the sensor and external data can be sent unsolicited to the interface 160 or can be solicited. These communication means can include standard protocols or proprietary protocols. Preferably the interfaces receive digital data but the interfaces can be configured to convert analog data into digital data. The interfaces 160, 170, 180 provide any required protocols, format conversion, or buffering required for receiving the video data 172, audio data 182, or sensor and external data 162. A Hierarchical Crowd Feature Detection (HCFD) module 120 receives the video data 172 from the video interface 170. An Audio Detection module 130 receives audio data 182 from the audio interface 180. The Auxiliary module 110 receives sensor and external data 162 from the interface 160, processes the sensor and external data, and provides data 118 to the HCFD module 120 and the Crowd Behavior Detection module 140.

The Auxiliary module 110 comprises three sub-modules; the weather detection module 112, the day/night detection module 114, and the ground plane calibration module 116. The Auxiliary module 110 processes and provides three types of information, weather, day/night light levels, and ground plane calibration. First weather, time, day, and GPS location data is utilized by the Day Night Detection module 114 for predicting lighting levels for a given location, time of day, time of year, and weather condition. The light levels predicted by the Day Night module 114 are used by the Background Model 124 to select an appropriate reference background model in case the lighting changes. Background model 124 automatically generates multiple reference background models based on the lighting changes or sudden scene changes in a day. External data such as schedule information can be used to indicate events such as, expected road traffic, additional crowds due to special events, and lighting events. For example, weekday commuter crowds could result in higher noise levels than during a weekend at the same time. A schedule could indicate that a sporting event was happening and thus would be an exception to the expected noise level on a weekend. The sensor and schedule data 118 is input to the Crowd Behavior Detection module 140 and utilized with the rules 145 in detecting a specified crowd behavior or mood.

The detected crowd features 128 by the Hierarchical Crowd Feature Detection module 120 and the detected audio characteristics 138 by the Audio Detection module 130 are input to a Crowd Behavior Detection module 140. The Crowd Behavior Detection module 140 is configurable to detect specific behaviors. This configuration is specified by selectable and configurable behavior detection rules 145 that can be defined by a behavior detection language. The detected behavior(s) 142 can be output to a response generation module 150 that generates a response that can include changes to the video camera, audio device, sensors, or visual or audio warnings to a human operator, storage for later analysis, display devices for human viewing, or a combination thereof.

Figure 10:
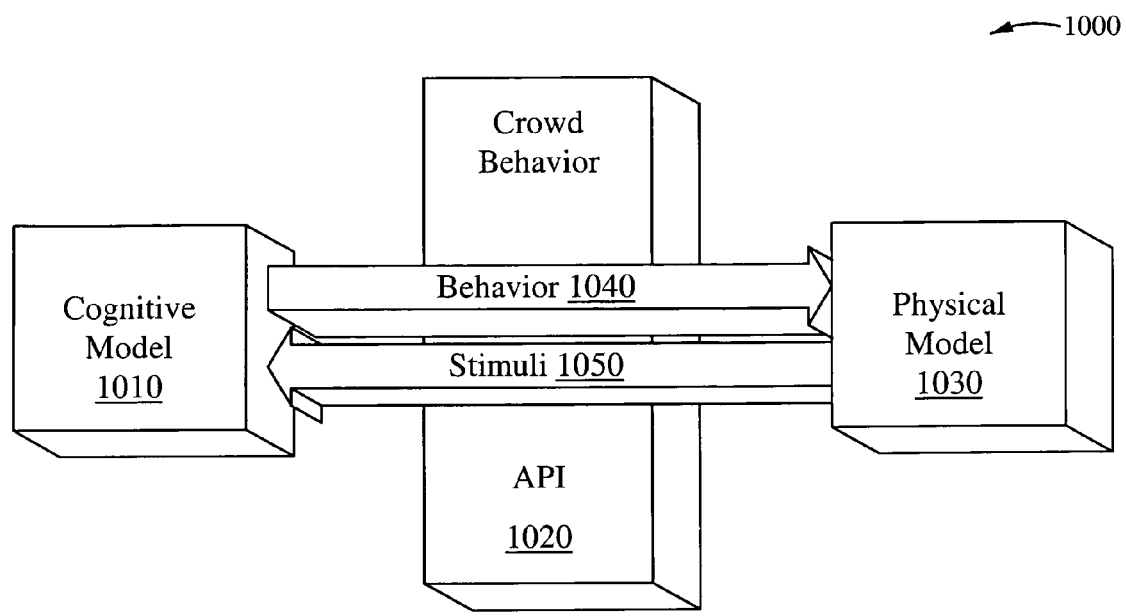
FIG. 10 illustrates a prior art crowd behavioral model.

The Auxiliary module 110 is also used to help in the generation of a background model of the video data 172. Crowd behavior can be triggered by some stimuli as described by Nguyen and McKenzie. One kind of such stimuli can be from acoustical events. For example, a big sudden noise or a scream could hugely affect crowd behavior as a whole. Audio features such as noise level, human speech, loud scream etc., can be detected with but not limited to HMM (Hidden Markov Model) learning algorithms. Those audio features can then be used when forming rules for detecting certain behaviors. FIG. 10 shows a behavior model used to process audio information. The model 1000 has a cognitive model 1010 of a crowd. The physical model 1030 generates stimuli 1050 that is input into the cognitive model 1010. A predicted behavior 1040 is returned to the physical model 1030. A crowd behavior API 1020 can be provided for using the model 1000.

Referring to FIG. 1A, the Ground Plane Calibration Module 116 is used by the Background Model module 124 to calibrate the crowd density using foreground detection. The Ground Plane Calibration module is also used by the Texture Analysis module 123 to generate crowd densities. The background model module 124 extracts foreground information from the input video data 172. GPS location and other information can be used in combination with the day night video detection algorithm to achieve better lighting transition period detection for intelligent background updating. In addition, multiple reference scene images are automatically learned to handle sudden lighting changes in the video. The scene images are automatically clustered to produce the reference image set. The closest reference image will be used in case of a sudden change of the scene. This allows the foreground detection to handle quick changes. Each individual background model is modeled using a mixture of Gaussian methods.

The HCFD (Hierarchical Crowd Feature Detection) module 120 includes several sub-modules. To detect crowd features 128, the HCFD module 120 processes auxiliary data 118 including ground plane calibration data 118 and video data 172 comprising crowds, sub-crowds within a crowd, queues of individuals, and individuals. The HCFD module comprises sub-modules including a Human Detection Module 121, a Motion Analysis and Tracking Module 122, Texture Analysis module 123, a Background Modeling Module 124, Motion Clustering and Segmentation module 125, and a Bayesian Fusion Engine 126. Each of these sub-modules can incorporate statistical feature generation to enhance the detection of crowd features.

Detected crowd features 128 by the HCFD module 120 includes a crowd size (number of people), the location of the crowd, the crowd motion dynamics including velocity and direction data, crowd motion history, sub-groups within a crowd, a queue of people, and crowd density. The crowd feature date is generated from the received 172 video data and optionally from the sensor and external data 118.

The crowd level feature set is the coarsest among all the feature sets. To accurately extract those features, the auxiliary module 110 ground plane calibration data is used with video data 172 in the generation of a background model.

The Background Model sub-module 124 extracts the foreground data and uses the ground plane calibration data 118 to detect crowd features from the video image data 172. The Background Model can use pixel-based models as described in D. Koller, J. W. Weber, and J. Malik. "Robust Multiple Car Tracking with Occlusion Reasoning." in *European Conf. on Computer Vision*. 1994, which is incorporated by reference. Additionally, the Background Model sub-module 124 can use region-based models as described in the references J. Sun, W. Zhang, X. Tang and H.-Y. Shum. "Background Cut" In European Conf. on *Computer Vision*. 2006 and the reference Y. Sheikh and M. Shah, "Bayesian Object Detection in Dynamic Scenes", IEEE *Computer Vision and Pattern Recognition*, San Diego, Jun. 20-26, 2005, which are both incorporated by reference. Further a frame-based model can be used according to the spatial size of its element as described in the reference N. Oliver, B. Rosario, and A. Pentland. "A Bayesian Computer Vision System for Modeling Human Interactions." in *Int'l Conf on Vision Systems*. 1999, which is incorporated by reference. Preferably a single Gaussian models or a Gaussian mixture models (GMM) are used. These models are described in C. Stauffer, W. E. L. Grimson, "Adaptive background mixture models for real-time tracking," *Computer Vision and Pattern Recognition*, 1999. Vol. 2, which is incorporated by reference. The background model extracts foreground information from the input video sequences. GPS location and other information can be used in combination with the Day Night Detection module 114 to achieve better lighting transition period detection for intelligent background updating. In addition multiple reference scene images are automatically sensed and stored to handle sudden lighting changes in the video data.

As in a typical real-world scenario, the presence of a complex background scene makes background modeling unstable and noisy with frequent activities and lighting changes. The image pixel color is prone to change in those areas that have the discontinuity (edges), usually caused by the native characteristics of image sensor and encoder. Using a so-called edge weighted foreground map algorithm that is similar to an approach described in the book by Sun, J. and Zhang, W. and Tang, X. and Shum, H. Y, "Background Cut", ECCV 2006, pp II: 628-641, which is incorporated by reference, the background structure can be nicely discounted producing a cleaner foreground extraction.

The features detected by the Background model 124 includes but is not limited to the presence of a crowd, location of the crowd or an individual, and the density of a crowd. These identified crowd features are used in a decision of whether to invoke 193 other crowd feature detection modules to improve the accuracy of the detected crowd features. If no crowd or individuals are detected, then the texture analysis module 123 and the Human Detection module 121 is not invoked. If there is a crowd, then the Texture Analysis module 123 is invoked. Further, the Human Detection module 121 is invoked if the Background Model module 124 determines that the crowd density is not overly dense such that human identification and tracking by the Human Detection module 121 would be too inaccurate. The crowd feature data 195 generated by the Texture Analysis module 123 and the Human Detection module 121 and the crowd feature data generated by the Background Model module 124 is input into the Bayesian Fusion Engine. Further, the Background model 124 calculates a confidence measure for each of the crowd feature detection module. The confidence measurement is used by the Bayesian Fusion Engine 126 module in determining crowd features with more accuracy. Alternatively, the Human Detection module 121 and the Texture Analysis module 123 can always be invoked and the Bayesian Fusion model module 126 will account for the presence or absence of crowd data in determining the statistically weighted features.

The Human Detection module 121 uses a hybrid-human detector utilizing multiple computer learning based human detectors for accurate human localization and density estimation. Past background models do not address many important situations because the background models are looking for difference (or change) within the entire background, while in real world applications, concern is with objects of interest that are often in the foreground (e.g. humans or vehicles). This divergence leads to information loss when a method relies solely on background models. In the present invention, this information loss is recovered by object-related modules, such as Human Detection 121 and Texture Analysis 123. These object-related modules in turn release the burden of the background model and make it possible to select computational efficient methods that can more quickly and accurately adapt to an entirely new scene.

Due to huge variations in illumination, viewpoint, crowd density, it is difficult to train a single detector, which is robust against all the variations. In general, a full human body detector is able to use most information, but it is most sensitive to changes in viewpoint, occlusion and camera distortion. A human head detector captures less information, but can be much stronger against those changes. An upper human body detector generally performs in between the performance of a human head detector and a full human body detector. To combine their advantages, the Human Detection module 121 uses a hybrid-human detector, which comprises three sub-detectors including a head detector, an upper human body detector and a full human body detector. Each detector is trained with a cascade Adaboost method, convolutional neural network methods, or any combination thereof.

Figure 2:
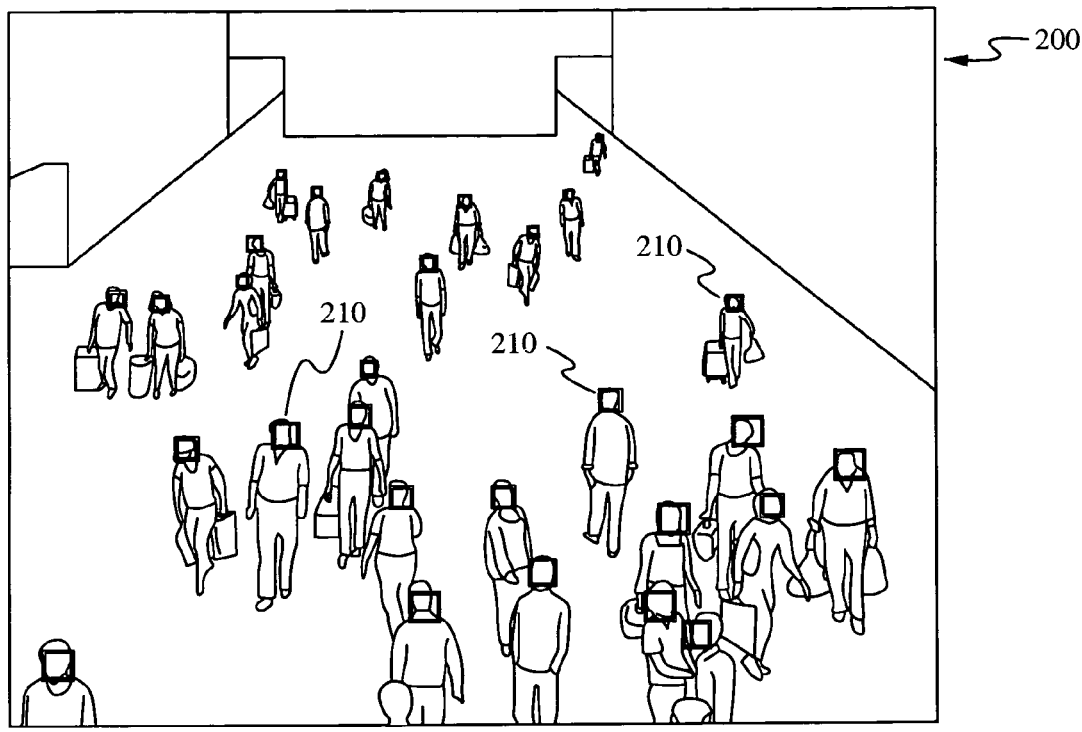
FIG. 2 illustrates a representation of a scene having a crowd of people where a human detection algorithm has identified the heads of the individual in the crowd.

A hybrid design improves detector accuracy, however one embodiment is structured such that each video frame is scanned by all its three sub-detectors. This substantially increases the computational complexity, which is approximately three times higher compared to a single detector. To enhance the efficiency, preferably a different embodiment that uses an interleaving scanning method as shown and described in FIG. 9 can be used. Preferably, a hybrid detector is used. FIG. 2 shows a representation of video image data where a human detection algorithm has identified people by the method described in FIG. 1. The identification is shown as a box around the heads of each individual.

Figure 9:
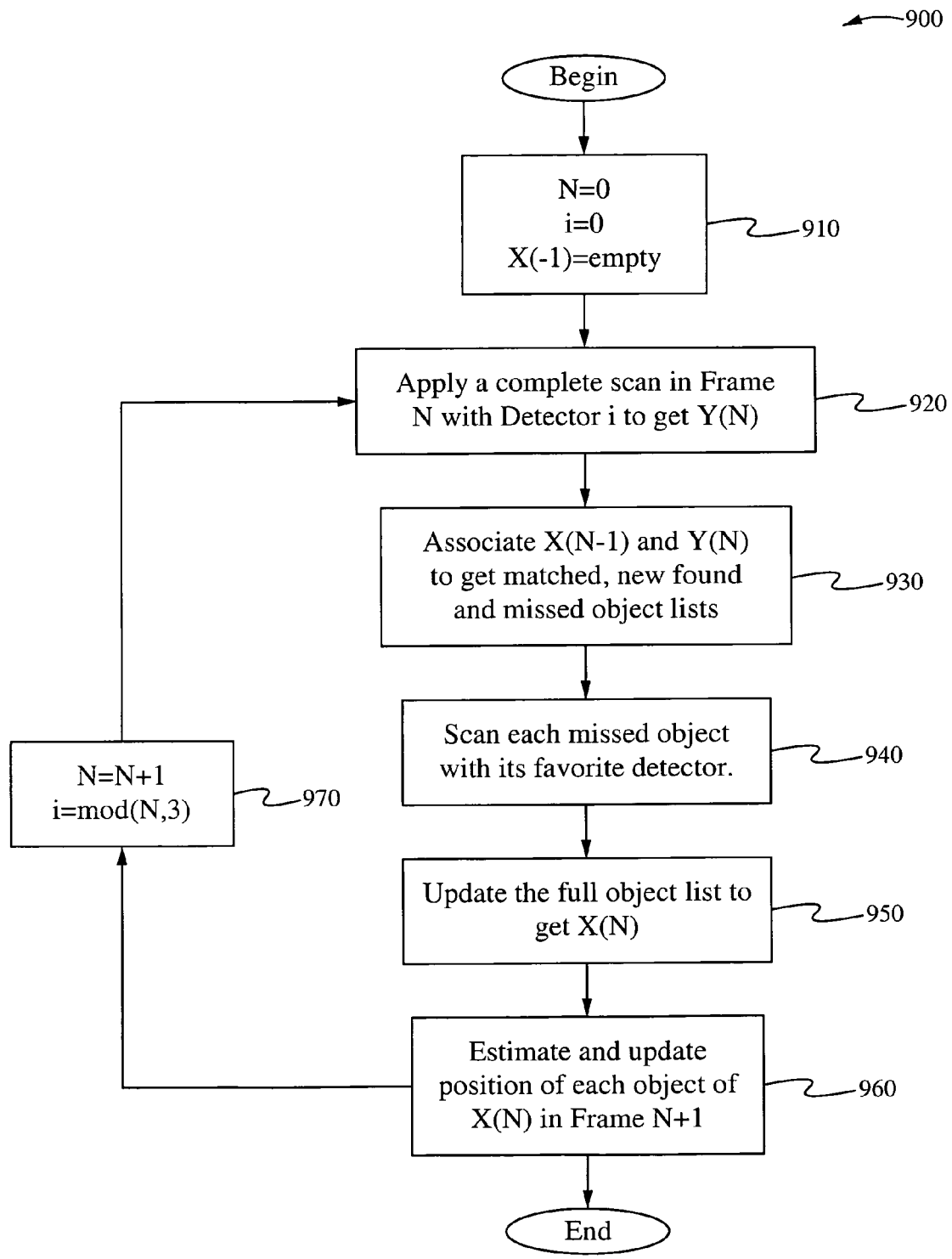
FIG. 9 is a process flow chart for the hybrid human identification algorithm.

FIG. 9 is an illustrative embodiment of the process 900 for a hybrid human detector. A hybrid design for improves human detection accuracy and efficiency. The detector processes a video frame with three sub-detectors. The process as shown in FIG. 9 utilizes an interleaved scanning method for the hybrid-human detector. The process begins at step 910. In the step 910, the process is initialized including initializing the process variables or hardware.

Let Detector 0, Detector 1, and Detector 2 denote the full body, upper body and head detectors respectively. Let X(N−1)={x1, x2, x3, ... } denote a list of objects detected in frame N−1. Each object xi=xi(i,j,width,height,score,k) is represented by its pixel location (i,j), pixel size (weight, height), the score last detected (score), and the detector ID (k), corresponding to the score. The detector k is also called the favorite detector to the object xi. A complete scan is meant to search each pixel location in a frame at all the possible object sizes. The initial setting: N=0, i=0, and X(−1) is empty.

In a step 920 a complete scan in Frame N with Detector i to get a list of objects, denoted as Y(N). In a step 930, associate Y(N) with previously detected objects, X(N−1) to get three lists of objects that include MatchedList T(N), where each object is found in both Y(N) and X(N−1); NewFoundList G(N), where each object is found only in Y(N); and MissedList M(N), where each object is found only in X(N−1).

In a step 940, each object is scanned in the MissList M(N) with its favorite detector in a local area around the object at a scale equal to the object size. The computation complexity of the local search is computational trivial due to small search area and search scales. All the found objects are added to the MatchList Y(N).

In a step 950, the MatchList Y(N) and NewFoundList G(N) are combined to form a new full object list X(N). The detect score and favorite detector id is updated for each object.

In a step 960, tracking methods are used including but not limited to Optical Flow to predict the position of each object of X(N) in next frame. The object location is updated with the predicted one.

In a step 970, the next frame N=N+1, is detected and next detector id with i=mod(N,3) and go to step 920.

From the proposed method, it can be seen that only one sub-detector is applied to conduct a complete scan every frame. This inventive method 900 significantly reduces the computational complexity, and improves the performance up to three times higher compared to the solution of running all the three sub-detectors per frame. Additionally, the proposed hybrid detector framework is an expandable structure. The number and types of sub-detectors are changeable. In addition to the three detectors used in the work, other detectors such as face detector, profile detector etc. can be accommodated in the system.

The texture analysis sub-module 123 uses texture analysis for crowd detection and crowd feature estimation. Preferably, texture based regression model is used to estimate the crowd density in extremely crowded areas. The texture based regression model provides accurate density features in such cases. One implementation of the invention uses HOG (Histogram of Gradient) features and SVM (Support Vector Machine) regression to train a density model for the human crowd. The function of this technique is described as follows.

Figure 3:
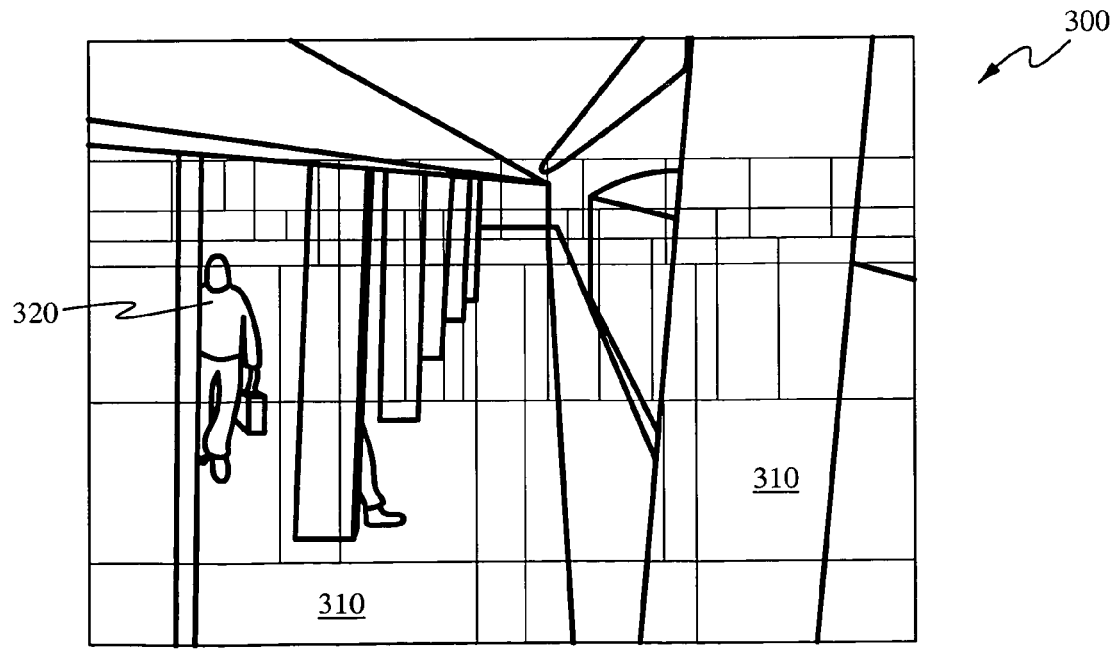
FIG. 3 illustrates a video scene when a textural algorithm is used to divide up the scene to determine crowd characteristics.

To make the crowd feature processing less time-consuming, the video frame is divided into overlapping blocks and density is estimated for each block. The divide is automatically generated based on ground plane calibration. The divide is formed with each dividing block containing roughly the same number of people if density is the same. FIG. 3 shows an example of a divide. The divide contains a number of blocks 310. The projected size of a human 320 on the ground into the image plane decides each block size.

Figure 4:
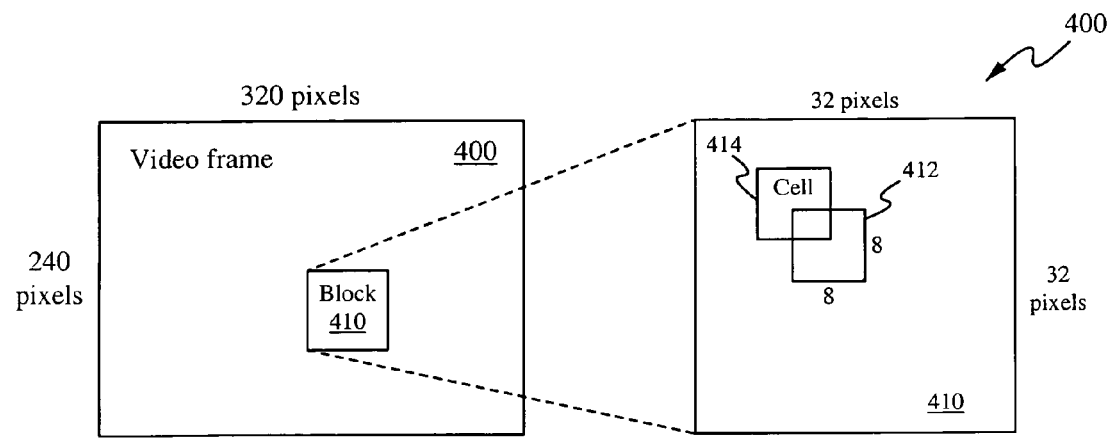
FIG. 4 illustrates one of the steps in the textual analysis of a video image.

FIG. 4 shows the method by which video data is processed to determine texture information. Each image block 410 within a video frame 400 is then resized to 32 pixels by 32 pixels. The resized block 410 is then divided into 8 pixels by 8 pixels overlapping cells 412, 414 with step size of 4 pixels. In this example, there are 49 cells in each block. The features are extracted for each cell with 4 orientation bins. HOG features from all the cells results in a feature vector with 196 values.

To train an SVM Regression model, the density value of each training feature vector should be calculated. Humans in the training samples are labeled for training. Given a human head location, the human height is determined using calibration information. By subsequently assuming the human width is a fixed ratio of the human height (in this view ⅔) a whole body human rectangle is obtained. The contribution of the human rectangle to the target density value of a block includes the proportion of the overlapping area to the area of the human rectangle. The target density value of each block is then summed up for all contributed density value from all labeled humans. The SVM Regression training is then performed on the generated feature vectors and their corresponding density values.

The block feature is extracted from the input frame. A density value is produced using the trained SVM regression model. A density map that has same dimension with input video frame can be generated. The value of each pixel in the density map is the average density value of the blocks in which it is found.

The hierarchical crowd feature detection model 120 uses the results of the human detection and textural analysis to provide an accurate crowd density map estimation. Fusion of the techniques is used to provide the features. Background modeling, human detector and texture analysis can all produce their estimate of the crowd density map. Each individual method has its advantage and disadvantage in different conditions, effectively fusing them together achieves accurate estimation in any condition.

Suppose $p_k$=P(crowd|k) is the density of a pixel from module k, the final density can be calculated using Bayesian fusion as:

$$P(\text{crowd} \mid \{p_k\}) = \sum_k P(\text{crowd}, k \mid \{p_k\}) =$$

$$\sum_k P(\text{crowd} \mid k, \{p_k\}) P(k \mid \{p_k\}) = \sum_k p_k P(k \mid \{p_k\})$$

where $P(\text{crowd} \mid \{p_k\})$ is the confidence measure of module k, which depends on the output of other modules.

$P(\text{crowd} \mid \{p_k\})$ can also be consider as a weight of each model k. The weight can be determined heuristically or by learning.

After getting the density map, crowd level features can be easily obtained. Each separate crowd is first obtained from the density map. Each crowd's features such as location, shape, size and count are then calculated from the density map.

Figure 5:
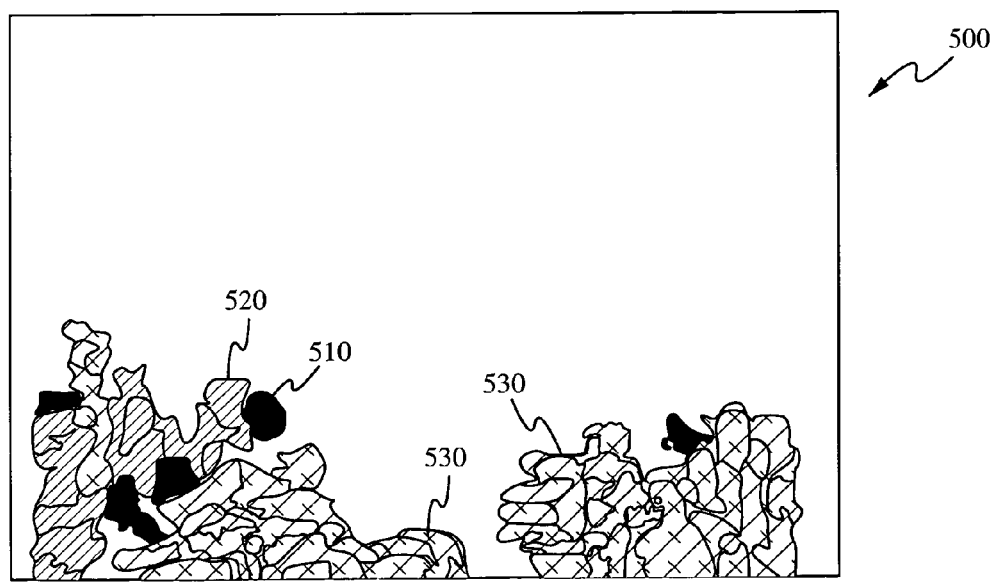
FIG. 5 illustrates a representation of an image where the crowd movement directions are represented by different fill patterns.

The Motion Analysis and Tracking sub-module 122 performs an optical flow analysis and accumulation for motion feature extraction. An optical flow algorithm like Lucas and Kanade's, generates pixel by pixel motion estimation between consecutive video frame input. Temporally accumulating the pixel motion forms a motion history and origin of each pixel. The motion of each pixel is then used to estimate the overall crowd motion features, including the dynamics of the crowd, the overall motion pattern of the crowd (like direction, speed), and where the source of the crowd. FIG. 5 shows a result of such accumulation with direction encoded 500. Regions with one direction of flow are shown using one pattern 510, while other direction of flows are shown by other patterns 520, 530.

In the present invention, human detectors and fast multiple hypotheses human tracking are used to generate each people's motion history, i.e. the moving trajectory. In an extremely crowded area, invocation of such tracking algorithms can be based on the initial sub-group detection, such that the system will not exceed its capacity by the tracking of a large number of people. The granularity provided by the system makes the detection of finer level behavior efficient and accurate. The details of the multiple hypotheses human tracking are defined in the commonly owned U.S. Pat. No. 7,148,912, granted Dec. 12, 2006, entitled "Video Surveillance System in which Trajectory Hypothesis Spawning allows for Trajectory Splitting" that is incorporated by reference in its entirety; U.S. Pat. No. 7,136,507, granted Nov. 14, 2006, entitled "Video Surveillance System with Rule-based Reasoning and Multiple-Hypothesis Scoring", that is incorporated by reference in its entirety; U.S. Pat. No. 7,127,083, granted Oct. 24, 2006, entitled "Video Surveillance System with Object Detection and Probability Scoring Based on Object Class", which is incorporated by reference in its entirety; and U.S. Pat. No. 7,088,846, granted Aug. 8, 2006, entitled "Video Surveillance System that Detects Predefined Behaviors based on Predetermined Patterns of Movement Through Zones", which is incorporated by reference in its entirety.

With the individual tracking result of human, features such as: the bidirectional counts of people going through certain area, the speed human, the rate of people going through an area, etc. can be easily obtained. This information is useful in determining queue characteristics such as wait times and flow rates.

Figure 7B:
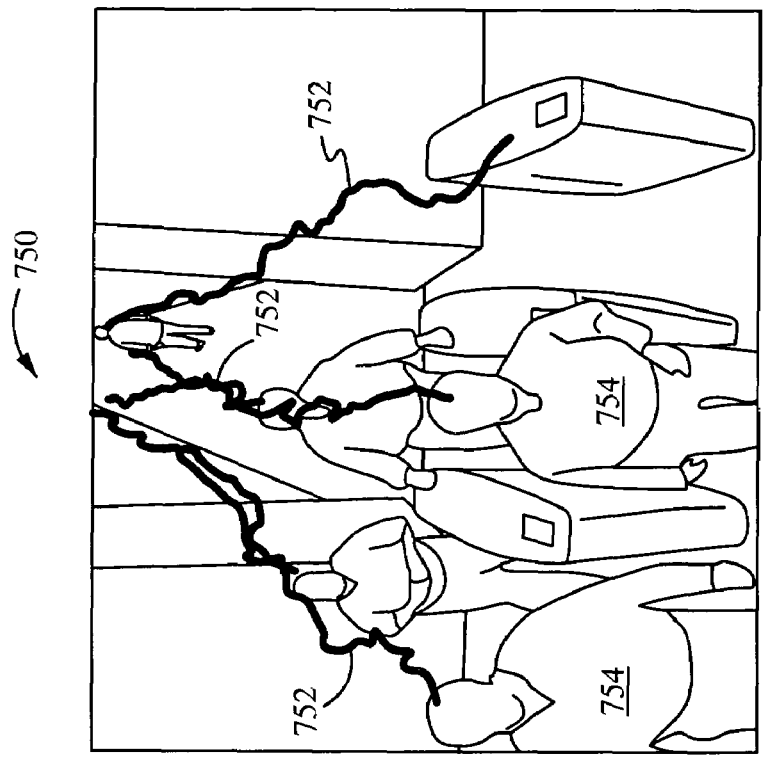
FIG. 7B illustrates another exemplar scene with several individuals identified and tracked temporally by the methods disclosed in the present invention.
Figure 7A:
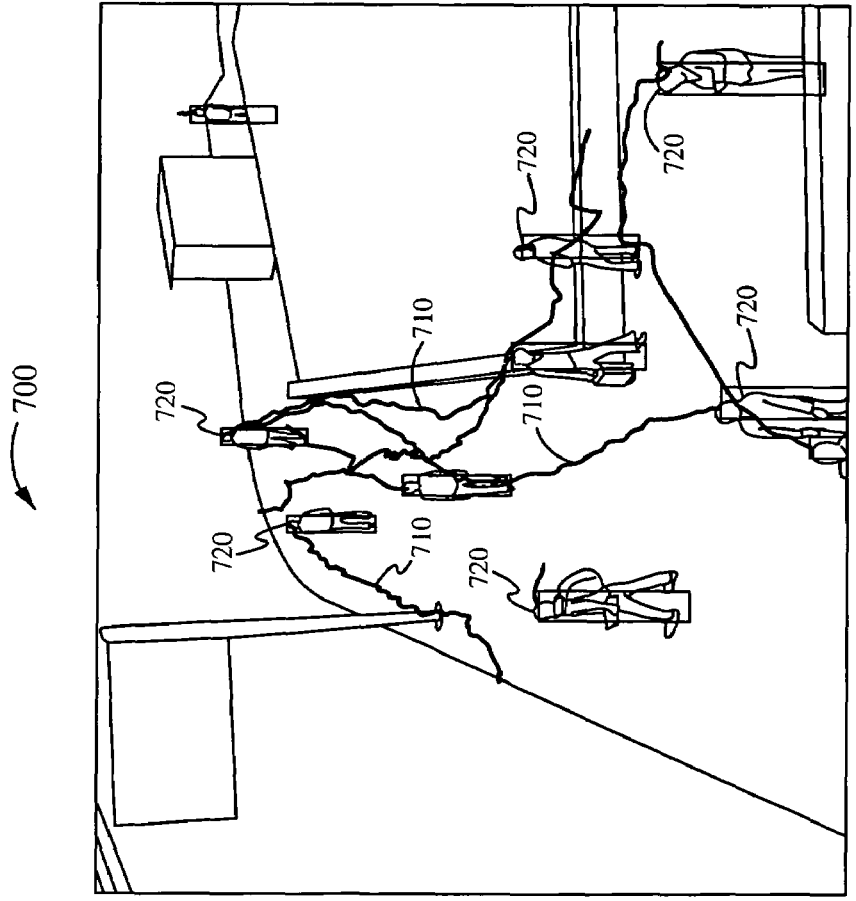
FIG. 7A illustrates a scene with several individuals identified and tracked by the methods disclosed in the present invention.

FIGS. 7A and 7B illustrate human motion tracking provided by the Motion Analysis and Tracking Module 122. In the exemplar scene 700, a number of people are walking around an area. The individuals in the area being identified as indicated by the rectangles 720 around the individuals. The identification of the individuals is performed by the Human Detection 121 sub-module. The tracks 710 show the path of an individual indicating the path taken by that person. The tracks 710 as shown are displayed on a human viewable device which can be controlled by the Response Generation module 150.

The Motion Clustering and Segmentation sub-module 125 is used for accurate crowd component segmentation and feature detection. In a large crowd, groups can be people of interest to a user. Being able to locate a specific group of people in the crowd allows flexibility and much more accuracy in detecting crowd behaviors and crowd moods.

All pixel locations represents the crowd can be clustered based on their motion history and their appearance. K-Mean and Hierarchical Meanshift clustering method are used to provide such grouping. In this Motion Clustering and Segmentation sub-module 125, features for each subgroup (each crowd component) are extracted similar to the crowd feature.

With the subgroup crowd features, the Motion Clustering and Segmentation sub-module 125 detect behaviors including two groups of people moving in the opposite direction and two groups that meet for a while.

Figures 6A, 6B:
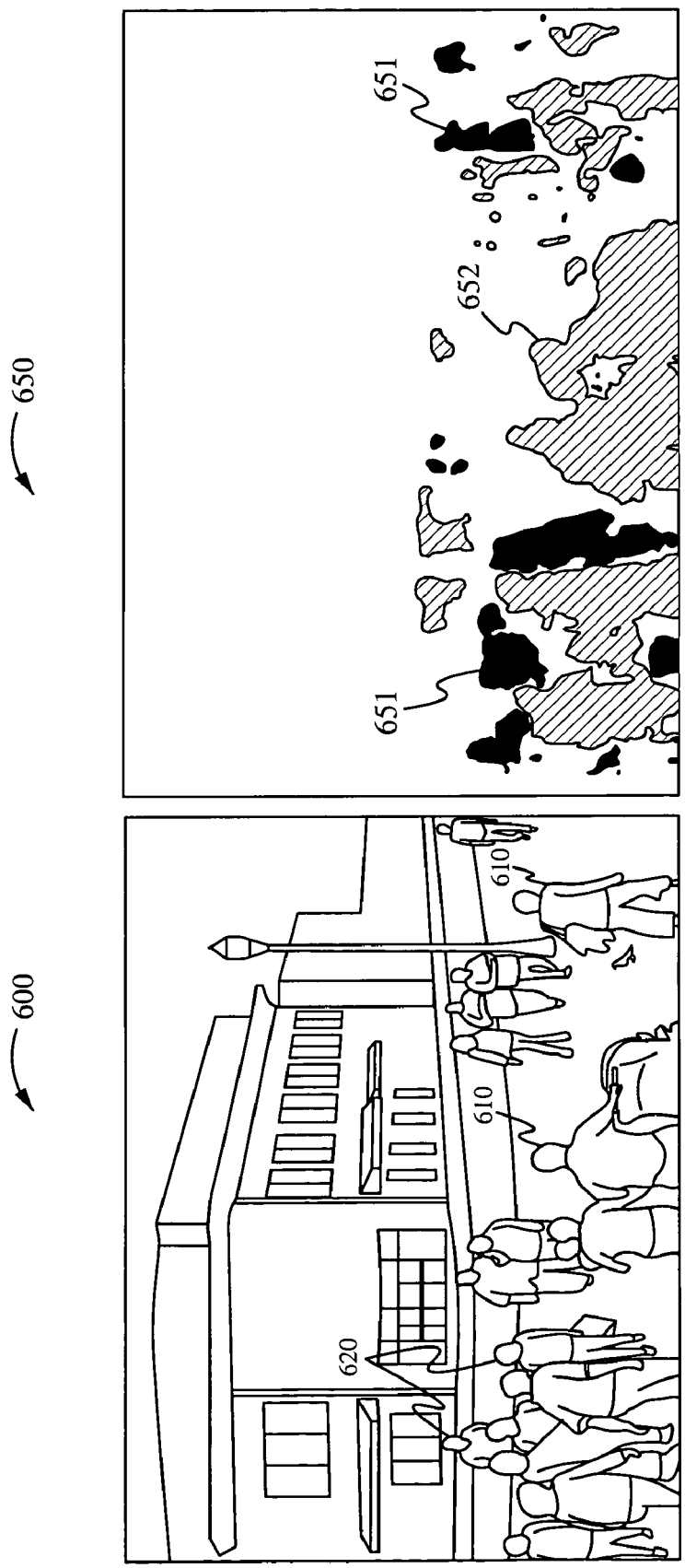
FIG. 6A represents a scene with groups of people moving in different directions.
FIG. 6B illustrates the scene of 6A where the groups are segmented into two groups based on the direction of movement.

FIG. 6A is exemplar of a single frame of a scene 600 analyzed by the motion clustering and segmentation sub-module 125. The scene contains a number of groups 610 and 620 and the scene having a crowd behavior. FIG. 6B shows a representation of the scene 650 being segmented into two groups 651 and 652 based on direction of movement.

The Crowd Behavior Detection module 140 receives the Hierarchical Crowd Feature Detection module output 128 and the Audio Detection module output 138 and detects specified crowd behaviors or crowd mood according to rules 145. Crowd and human behavior can be described using three different levels of basic objects detected by the system: Crowd, Crowd Sub-group and individual human. Each basic object is associated with many attributes or features that can be detected and provided by the system. For example, a crowd object can have attributes such as size, location, density, duration of the crowd, motion direction, speed, etc. Statistical and temporal features associated with certain areas are also important for rule description. Examples of statistical features include the counts of people going through an area or a line, the average speed of people going through an area, the average number of people in a defined area in a defined time period, etc. To define rules for behavior detection, a user can also define zones or areas in the video input that are of specific interest. For example, a user defined counting line, user defines a sub-monitoring area for a triggering event. So a behavior description model includes at least the following components: basic objects (crowd, crowd sub-group, individual human) and their attributes, zones and their statistical features, the interaction between objects and between object and zone.

The detected behavior output 142 is generated by the Crowd Behavior Detection module 140. To achieve easy behavior description for the end user, a simple behavior description language provides the components mentioned earlier. Any language can be chosen or developed to facilitate this purpose. For example, a C++, Java, XML or Python languages can be directly used. With the hierarchical human/crowd features, describing a new behavior is very easy to implement and can be quickly developed and plugged into an existing system.

Alternatively, a graphical design tool can be used. To demonstrate the use of such system, an example that shows a flexible and easy to customize system. An exemplar behavioral description includes a representation as followed. One rule representation could indicate to "Detect a crowd of more than 10 people moving from a defined zone A to a defined zone B." Another representation could indicate; "Detecting two crowds of people of more than ten meeting together" or "If defined zone A has more than ten people, and there are five people going from left to right across a defined counting line B, raise an alert." Since a crowd is a basic object, such rules are easy to form and are flexible in their description.

Some behaviors that can be detected include; a crowd forming, a crowd dispersing, two way traffic, a waiting crowd, a quick moving crowd, a very crowded scene, a medium crowded scene, and a non-crowded scene.

Figure 12:
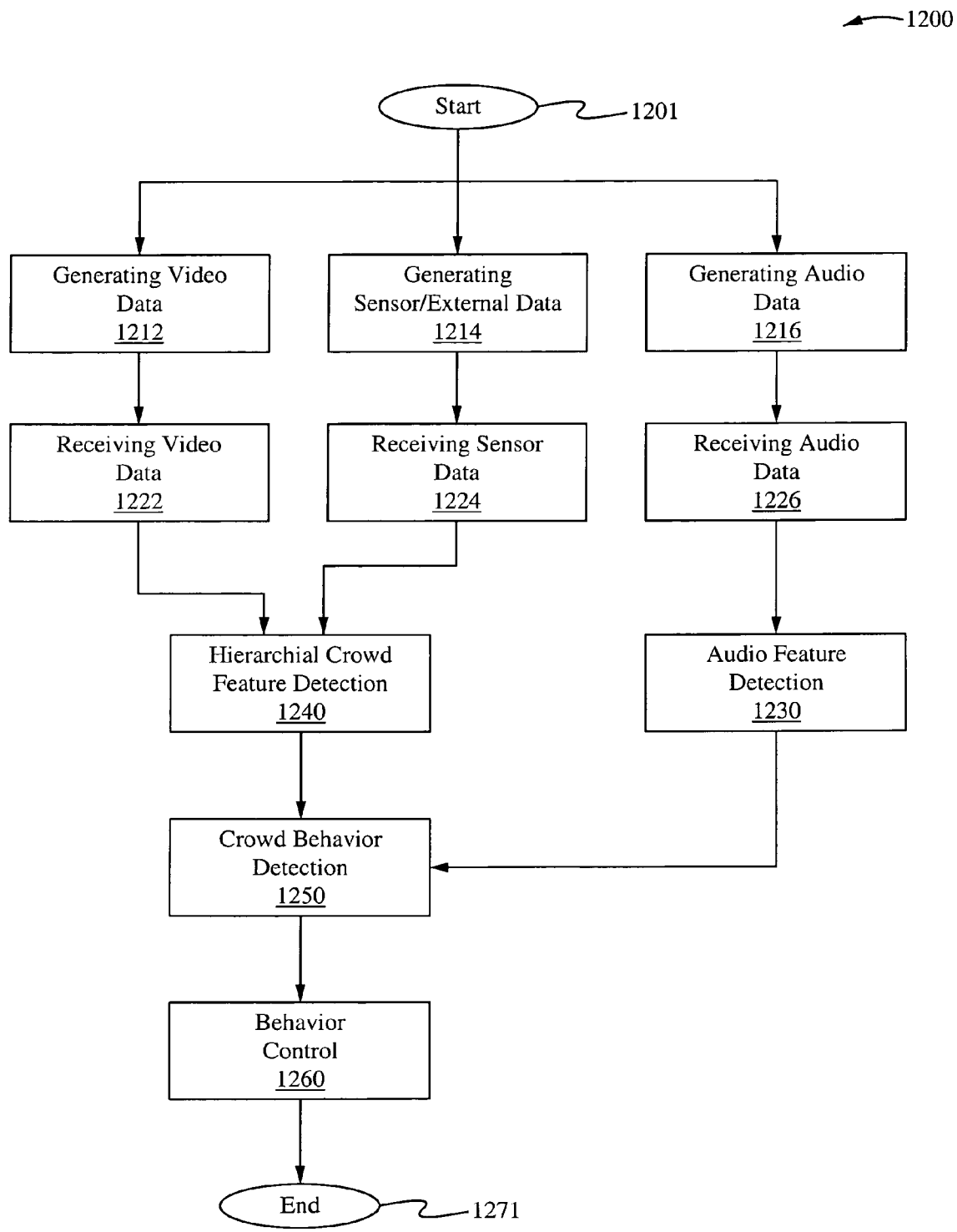
FIG. 12 illustrates a process flow chart for the detection of a configurable crowd behavior detection process.

FIG. 12 illustrates the process of selectively identifying a behavior or mood of a crowd. The process begins at start 1201. The process can include a step of generating video data 1212 of a scene containing a crowd of people. A crowd can contain one or more individuals, groups or subgroups within a crowd, a queue of people within a crowd or any combination thereof. The video data can be analog or digital. Preferably, the video data is a series of digital frames of a scene. Also, the process can include the step of generating and receiving sensor data or generating and receiving external information 1214. The sensor data includes but is not limited to weather, location, GPS, time data, or any combination thereof. Further, the process can include the step of generating audio data 1216. The audio data preferably corresponds to the environment from which the video data is taken. The audio signal generation can include directional microphones, omnidirectional microphones, and multiple microphones using beam forming digital processing techniques to provide spacial directionality to the audio data. The spacial directionality can be dynamic or statically set. The generation of the video, audio, and sensor data can be generated concurrently. Exemplar video sources include digital video cameras used for surveillance but any digital video camera will work including a webcam. Sensor sources can include local and remote weather stations, GPS receivers, manual entry of information into a system. External information includes data from wired and wireless communication links including the Internet. The external information can also include weather information, location, time, date, event schedule information, or national security threat level information. Types of location information useful in characterizing the audio data include, airport terminal, airport exit lane, queue, street side walk, exit of subway station, entry of large department stores, train station, shopping street, bus stop, school gate area, busy street scene with vehicle traffic, subway platform, cross walk, entry and exit of a building or store, street corner, parking lot, and airport check-in area. The sensor and event information is passed on the Crowd Behavior Detection step 1250 and used in conjunction with rules to detect behaviors.

In the steps 1222, 1224, and 1226 video, sensor, and audio data is received. The receiving steps 1222, 1224, and 1226 can include converting the data from analog to digital, changing the format of the video, sensor, and audio data, or implementing any protocols needed in receiving the video, sensor, or audio data. The reception of the data can be either dynamic or The steps 1224 and 1226 are optional.

In a step 1230, audio features are detected. The detections can include mood analysis of a crowd, sub-crowd, or individual. Further, the detected audio features can include leadership detection where an individual within a crowd is identified as standing out among the crowd based on characteristics including loudness and tone. The details of the audio processing is discussed above for module 130 of FIG. 1A. The detected audio features are utilized by the Crowd Behavior Detection step 1250.

In a step 1240, hierarchical crowd features are detected including course and fine grain crowd features including sub-crowds or queues of people in a crowd. The processing steps of hierarchical crowd feature extraction are shown in more detail in FIG. 13 and details regarding the processing steps are provided in the description of FIG. 13. The detected crowd features are used by Crowd Behavior Detection Step 1250.

In a step 1250 the detected crowd feature from step 1240 are analyzed for the detection of a crowd behavior. This detection can include utilizing the detected audio features from step 1230. Configurable rules are used to specify the type of behaviors to be detected. Details of the types of information received by the Crowd Behavior Detection 1250 is described above for FIG. 1A module 140.

The process can include generating a response to the detected crowd behavior in FIG. 1250. In a step 1260, the detected crowd behavior from step 1250 is received. A response is generated based on the behavior or crowd mood. Examples a response can include turning on a video camera, changing the field of view of a camera, changing the resolution of an area of a video image, storing of video data, storing or audio data, activating a visual or audio alarm, changing the video display viewed by security personal, making an automated phone call, or sending an email or text message, or logging information into an electronic database. One skilled in the art would appreciate that the steps illustrated in FIG. 12 are only one embodiment of the invention. The practice of the invention could include steps being added, removed, practiced in a different order, performed concurrently, or repetitively.

Figure 13:
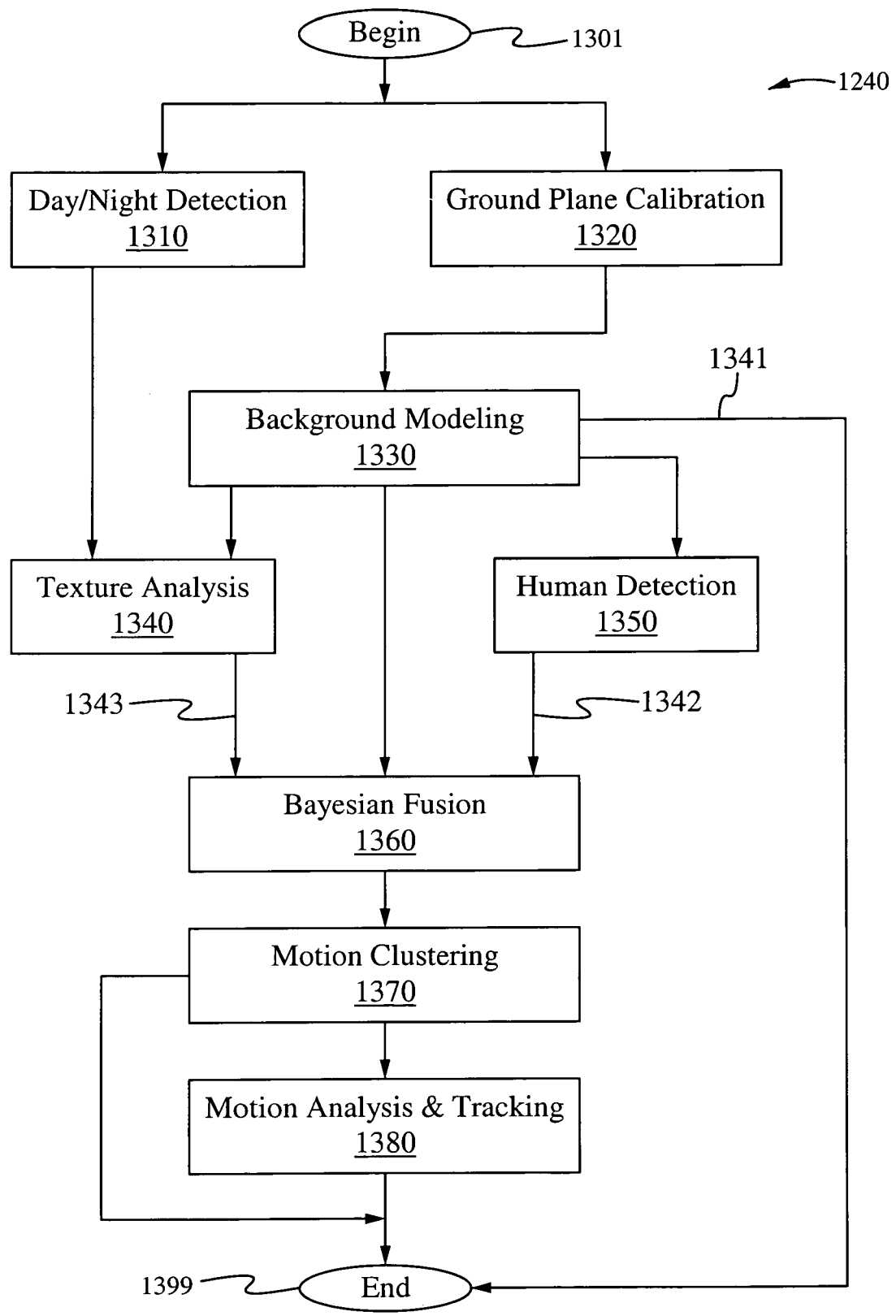
FIG. 13 illustrates the process flow chart for the hierarchical crowd feature detection using a hybrid-human detection and Bayesian Fusion.

One embodiment of a process of Hierarchical Crowd Feature Detection 1240 is illustrated in FIG. 13. The process starts at Begin 1301. This step can include initialization of variables and hardware. In a step 1310 Day/Night Detection 1310 is performed. In this step 1310, weather, GPS, time, date data and external data, or a combination thereof can be received to for an estimate of the light level for the area from which video data is being received. The GPS data can tell the time when the sun is to set.

The Ground Plane Calibration step 1320 generates a calibration between video input image and the real physical ground of the scene. This calibration makes it possible to get the correct density estimation at different locations on the video image to account for the fact that an individual closer to a video source will occupy more pixels of the video image than an individual father away from the video camera.

The background modeling step 1330 utilizes information generated in the Day Night Detection step 1310 to extract the foreground information. The foreground data can be determined by using techniques know in the art to remove the background data. The foreground information and ground plane calibration data can be processed to identify basic crowd features. The estimated features can include but are not limited to identifying the presence of one or more crowds, the location the crowd, crowd density, crowd count, or detection and queue features within the crowd. The Background Modeling step 1330 controls the used of multiple crowd feature detection techniques to determine a refined estimate of the crowd features. In this example, the background Model first determines the crowd features including but not limited to the presence of a crowd, the crowd location, crowd density, and count. If no crowd or individuals are detected, no other crowd analysis steps are performed and the process exits 1399 for that video frame. If a crowd is detected that is not too dense such that individual human detection can not reliably be performed, then the human detection step 1350 is performed. To further enhance the crowd estimates a texture analysis step 1340 is performed on the video stream. Further, the background modeling generates accuracy parameters for each detection algorithm. The features detected by the background modeling step 1330, the texture analysis step 1340 if performed, and the human detection step 1350, if performed, and the accuracy estimations for each crowd feature detection step are provided as input to the Bayesian Fusion step 1360. The Bayesian Fusion step 1360 calculates the most likely crowd features given the accuracy estimates calculated for each of the crowd feature detectors used. The calculations used for the Bayesian Fusion step 1360 are described in FIG. 1A for the Bayesian Fusion Engine module 126. In this example up to three crowd analysis algorithms are input into the Bayesian Fusion step 1360 but the use more crowd feature or algorithms are contemplated.

In a step 1370, the crowd features detected by one or more the Background Modeling step 1330 step, Texture Analysis step 1340, Human Detection step 1350, or Bayesian Fusion step 1360 is processed to perform motion clustering. This step 1370 operates as described above for the Motion Clustering and Segmentation module 125 of FIG. 1A. If the Human Detection Step 1350 is generating data, then the Motion Analysis & Tracking step 1380 processes this data to generate tracking data. The tracking data can be used to display tracks of people moving through a scene. The process ends at the step 1399. One skilled in the art would appreciate that the step illustrated in FIG. 13 are only one embodiment of the invention. The practice of the invention could include steps being added, removed, practiced in a different order, performed concurrently, or repetitively.

Figure 8:
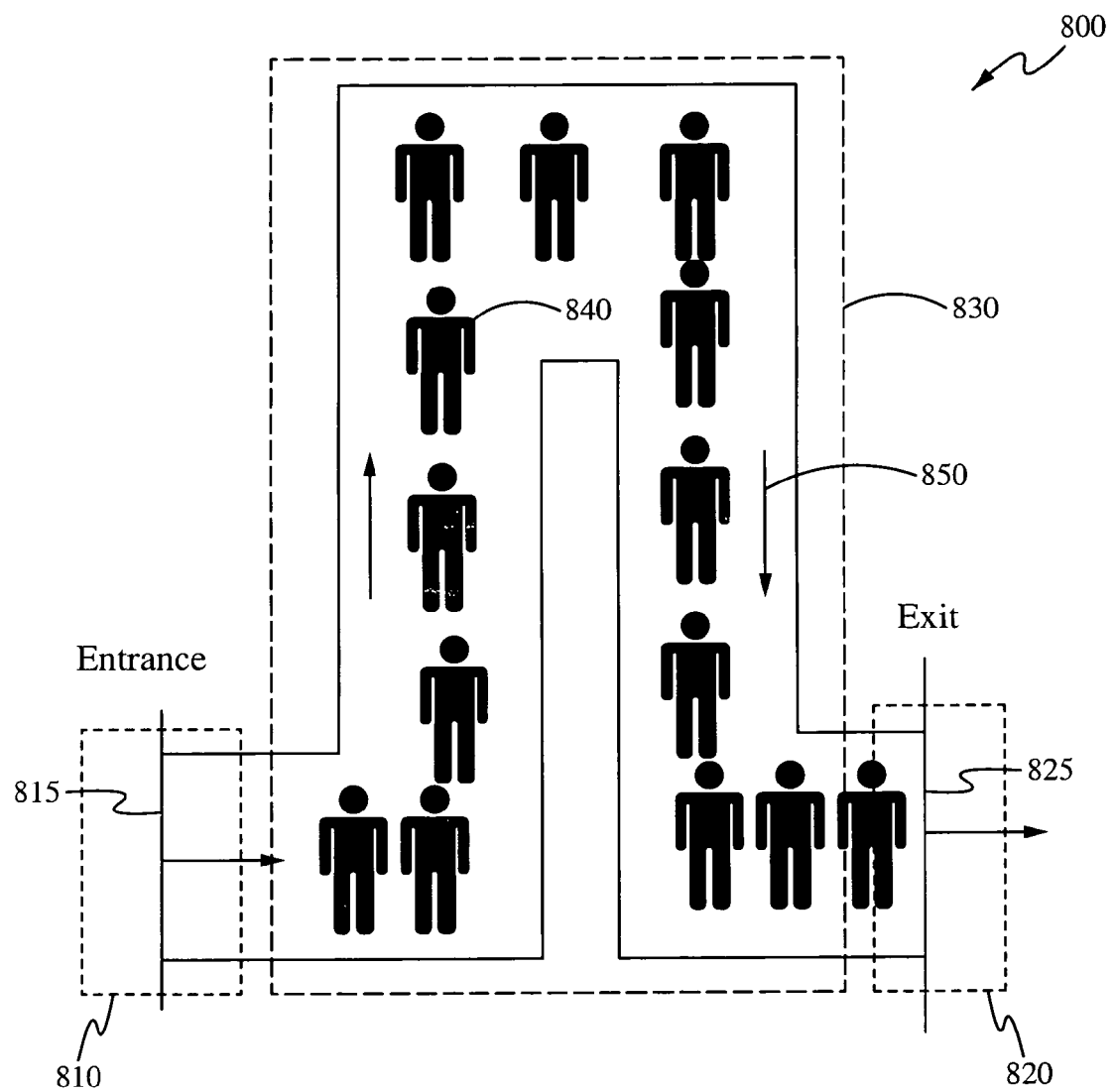
FIG. 8 is illustrative of a queue of people on which a queue analysis method of the present invention would determine characteristics such as waiting time.

FIG. 8 illustrates a video representation of a queue of individuals entering and exiting the queue 800. The queue comprises an entrance 815, a queue of people 840 having a flow rate 850 and an exit 825. In this example, three video areas of interest are defined within the video data. One is a queue entrance region 810, another is an queue exit region 820, and another is a queue region of interest 830. The queue entrance region 810 is an area through which individuals 840 enter the queue. The queue exit 825 is an area through which individuals 840 exit the queue. The queue region of interest 830 is the area containing the individuals 840 within the queue.

Figure 14:
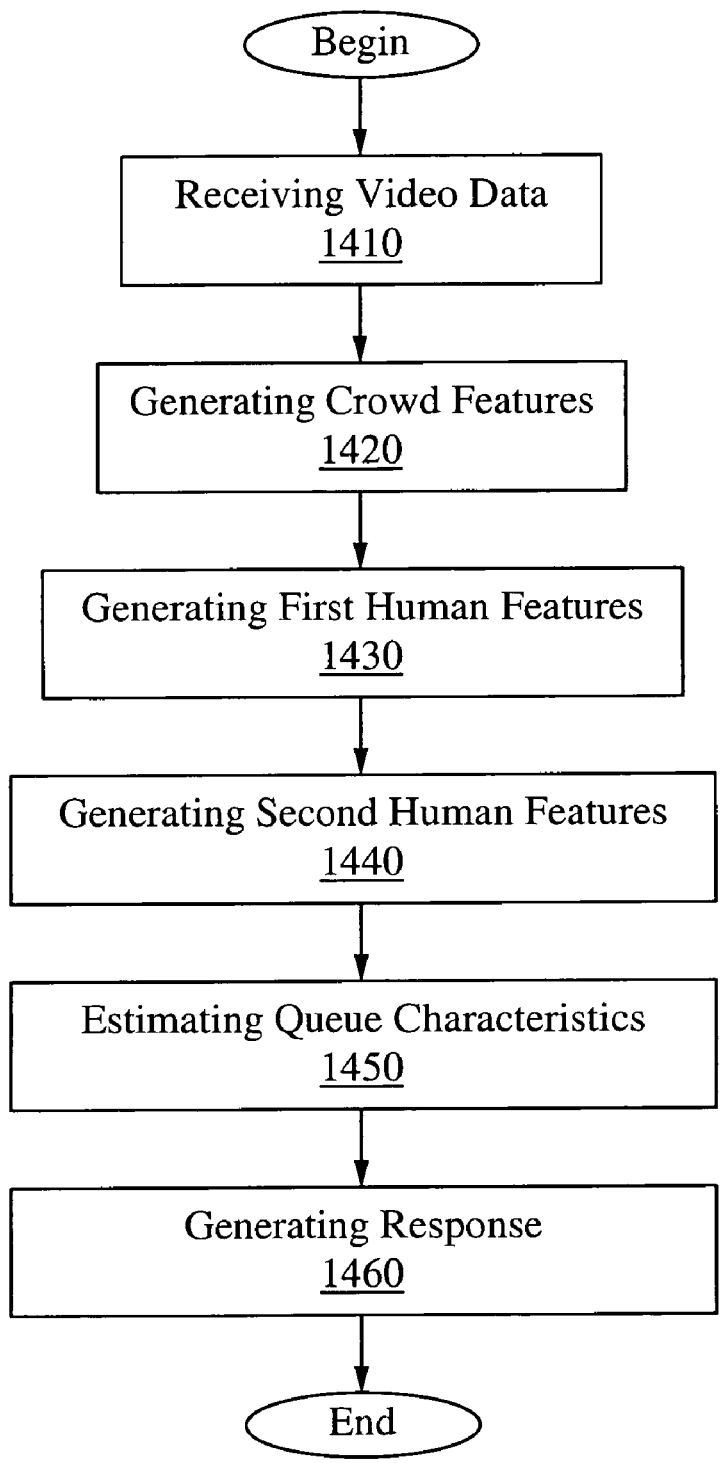
FIG. 14 illustrates a process flow chart for a queue characterization process.

FIG. 14 illustrates a computer processor automated method of characterizing a queue of people. The process begins at start. In a first step 1310, video data is received. Preferably, the video data is digital. However, the video data can be analog and converted to digital.

In a step 1420, a queue region of interest is defined from the video data. This region of interest can be defined to cover all the people within the queue. Using the technique, as described in FIG. 1A, Hierarchical Crowd Feature Detection 120, crowd features are identified. The crowd features include the number of people in the queue.

In a step 1430, a first human feature is generated from the queue entrance region. The human detection techniques as described for 121-FIG. 1A is used to identify people entering the queue. This includes but is not limited to the times and count of people entering the queue.

In a step 1440, a second human feature is generated from the queue exit region. The human detection techniques as described for 121-FIG. 1A is used to identify people exiting the queue. This includes but is not limited to the time and count of people exiting the queue.

In a step 1450, the information generated in the steps 1420, 1430, and 1440 is used to calculate queue length, queue speed, and queue wait-time. This includes the generated crowd features and identifying people entering and exiting the queue.

In a step 1460, the calculated information, the queue length, speed, and wait-time are used to generate a response. The response includes but is not limited to generating computer monitor notices and human detectable alerts such as an audio warning. The process finishes at end. One skilled in the art would appreciate that the step illustrated in FIG. 14 are only one embodiment of the invention. The practice of the invention could include steps being added, removed, practiced in a different order, performed concurrently, or repetitively.

Figure 11:
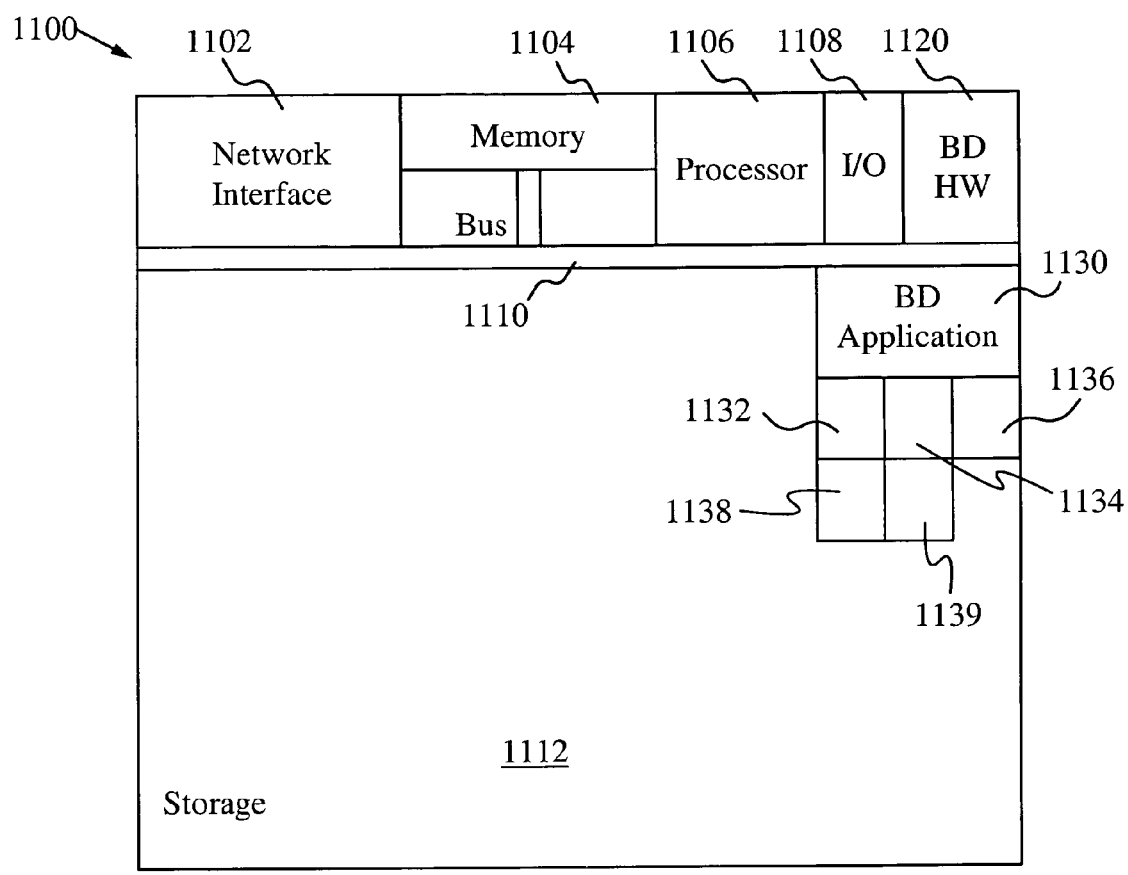
FIG. 11 illustrates a block diagram of an exemplary computing device configured to implement a configurable crowd behavior detection algorithm.

FIG. 11 illustrates a block diagram of an exemplary computing device 1100 configured as a programmable device configured to implement a computer automated method of selectively identifying a behavior of one or more humans. The computing device 1100 can be part of a system for the selectable detection of a crowd behavior or crowd mood from a crowd of one or more people. The crowd can include having sub-crowds within a crowd. The computing device 1100 can receive video data, audio data, and other sensor data including weather, GPS, time, and date data. The computing device 1100 can include a storage system 1112 for program and data storage. The data storage can include intermediate processing results, detected behaviors of crowds or individuals, image, audio, and sensor data. The storage of the processing code and data can be stored on separate devices or on the same device as the programmable device. For example, the programming code can be stored on a tape, a local hard drive, CD-ROM, a DVD, or solid state memory. Further, the computing device 1100 is can communicate with other computational systems including a human interface such as a graphical user interface. The communication can be through a network, direct communication through a dedicated communication link, or through an operating system communication channel such as a socket. In general, a hardware structure suitable for implementing the computing device 1100 can include a network interface 1102, a memory 1104, a processor 1106, I/O device(s) 1208, a bus 1110 and a storage device 1112. The choice of processor is not critical as long as a suitable processor with sufficient speed is chosen. The memory 1104 can be any conventional computer memory known in the art. The storage device 1112 can include a hard drive, tape, CDROM, CDRW, DVD, DVDRW, flash memory card or any other storage device. The computing device 1100 can include one or more network interfaces 1102. An example of a network interface includes a network card coupled to an Ethernet or other type of LAN. The I/O device(s) 1108 can include one or more of the following: keyboard, mouse, monitor, display, printer, modem, touchscreen, button interface and other devices including remote systems. The behavioral detection application (BD) 1130 detects configurable crowd behaviors from video data and optionally audio and sensor data. The BD application comprises the Auxiliary module 1132 (optional), the Hierarchical Crowd Feature Detection module 1134, the Audio Detection module 1136 (optional), the Crowd Behavior Detection and rules module 1138, and the response generation module 1139 (optional). More or fewer components shown in FIG. 1A can be included in the computing device 1100. Additional processors, either distributed or not distributed, and additional storage can be incorporated.

Reference has been made in detail to the preferred and alternative embodiments of the invention, examples of which are illustrated in the accompanying drawings. While the invention has been described in conjunction with the preferred embodiments, it will be understood that they are not intended to limit the invention to these embodiments. On the contrary, the invention is intended to cover alternatives, modifications and equivalents, which can be included within the spirit and scope of the invention. Furthermore, in the detailed description of the present invention, numerous specific details have been set forth in order to provide a thorough understanding of the present invention. However, it should be noted that the present invention can be practiced without these specific details. In other instances, well known methods, procedures and components have not been described in detail as not to unnecessarily obscure aspects of the present invention.

REFERENCES

The references listed below provide information on crowd behavior and crowd mood analysis and image processing and feature detection algorithms. All of the reference listed below are incorporated by reference.

Q. H. Nguyen, F. D. McKenzie, and M. D. Petty, "Crowd Behavior Cognitive Model Architecture Design", *Proceedings of the* 2005 *Conference on Behavior Representation in Modeling and Simulation*, Universal City Calif., May 16-19, 2005.

D. M. Gavrila. "Protecting pedestrians in traffic: Sensor-based approaches". *IEEE Intelligent Systems,* 2001.

S.-Y. Cho, T. S. Chow, "A Fast Neural Learning Vision System for Crowd Estimation at Underground Stations Platform", *Neural Processing Letters* 10: 111-120, 1999.

N. Paragios, V. Ramesh. "A MRF-Based Approach for Real-Time Subway Monitoring," CVPR, vol. 01, no. 1, p. 1034, 2001

P. Reisman, O. Mano, S. Avidan and A. Shashua, "Crowd detection in video sequences", *IEEE Intelligent Vehicles Symposium*, Jun. 14-17, 2004.

D. Hoiem, A. A. Efros, and M. Hebert, "Putting Objects in Perspective", in *IEEE International Conference on Computer Vision and Pattern Recognition* (CVPR), 2006.

Turner, Ralph, and Lewis M. Killian. *Collective Behavior* 2d ed. Englewood Cliffs, N.J.: Prentice Hall, 1972; 3d ed., 1987; 4th ed., 1993.

Rheingold, Howard, *Smart Mobs: The Next Social Revolution,* 2003.

Mc Phail, Clark, *The Myth of the Madding Crowd*, New York, Aldine de Gruyter, 1991.

Canetti, Elias (1960). Crowds and Power. Viking Adult. ISBN 0670249998.

S. R. Musse and D. Thalmann, "Hierarchical model for real time simulation of virtual human crowds", *IEEE Transactions on Visualization and Computer Graphics*, Vol. 7, No. 2, April-June 2001, pp. 152-164.

D. Koller, J. W. Weber, and J. Malik. "Robust Multiple Car Tracking with Occlusion Reasoning." in *European Conf on Computer Vision.* 1994.

C. Stauffer, W. E. L. Grimson, "Adaptive background mixture models for real-time tracking," *Computer Vision and Pattern Recognition,* 1999. Vol. 2.

J. Sun, W. Zhang, X. Tang and H.-Y. Shum. "Background Cut". In European Conf. on *Computer Vision.* 2006.

Y. Sheikh and M. Shah, "Bayesian Object Detection in Dynamic Scenes", IEEE *Computer Vision and Pattern Recognition*, San Diego, Jun. 20-26, 2005

N. Oliver, B. Rosario, and A. Pentland. "A Bayesian Computer Vision System for Modeling Human Interactions." in *Int'l Conf. on Vision Systems.* 1999.

K. Toyama, J. Krumm, B. Brumitt, and B. Meyers, "Wallflower: Principles and Practice of Background Maintenance", *International Conference on Computer Vision* (ICCV), 1999.

Y. LeCun, L. Bottou, Y. Bengio, and P. Haffner, "Gradient-Based Learning Applied to Document Recognition," *Proceedings of the IEEE*, vol. 86, no. 11, pp. 2278-2324, November 1998.

J. C. Platt, "Probabilistic Outputs for Support Vector Machines and Comparisons to Regularized Likelihood Methods", in *Advances in Large Margin Classifiers*, A. Smola, P. Bartlett, B. Schölkopf, D. Schuurmans, eds., pp. 61-74, MIT Press, (1999).

B. Lucas and T. Kanade, "An iterative image registration technique with an application to stereo vision". In Proceedings of Imaging understanding workshop, pp 121-130, 1981.

"PLI Dual Band Camera Data sheet", on-line document from http://www.physimetrics.com.

Paul Viola and Michael J. Jones, "Robust real-time face detection", International Journal of Computer Vision, vol. 57, pp. 137-154, May 2004.

F. Crow, "Summed-area tables for texture mapping", in SIGGGRAPH, 1984, vol. 18(3), pp. 207-212.

Yoav Freund and Robert E. Schapire., "A decision-theoretic generalization of on-line learning and an application to boosting", Journal of Computer and System Sciences, vol. 55(1), pp. 119-139, 1997.

J. Friedman, T. Hastie, and R. Tibshirani, "Additive logistic regression: a statistical view of boosting", Annals of Statistics, 2000.

Stan Z. Li and ZhenQiu Zhang, "FloatBoost learning and statistical face detection", IEEE Transactions on Pattern Analysis and Machine Intelligence, vol. 26, no. 9, pp. 1112-1123, September 2004.

Kah-Kay Sung, "Learning and example selection for object and pattern detection", PhD thesis, MIT AI Lab, Available as AI Technical Report 1572, January 1996.

Sun, J. and Zhang, W. and Tang, X. and Shum, H. Y, "Background Cut", ECCV 2006, pp II: 628-641

Wu, Xinyu Liang, Guoyuan Lee, Ka Keung Xu, Yangsheng, "Crowd Density Estimation Using Texture Analysis and Learning", IEEE International Conference on ROBIO 2006, pp. 214-219.

What is claimed is:

1. A computer automated method of selectively identifying a behavior of a crowd comprising the steps:
   receiving video data of a crowd;
   receiving audio data corresponding to an environment around the crowd;
   processing audio data thereby identifying audio characteristics;
   generating hierarchical human and crowd feature data from the video data; and
   selectively identifying a behavior of the crowd by processing the hierarchical human and crowd feature data according to a configurable behavior rule wherein the processing is configured to select a behavior wherein selectively identifying a behavior utilizes the identified audio characteristics.

2. The method of claim 1, further comprising the step:
   receiving sensor data corresponding to the environment wherein the sensor data is at least one of a GPS data, location, weather data, date data, and time data; and
   wherein the generating hierarchical human and crowd feature data from the video data includes processing the sensor data.

3. The method of claim 2, wherein the processing the audio data includes processing the sensor data to identify audio characteristics.

4. The method of claim 3, further comprising the step of generating the behavior rules using the behavior description language, the graphical tool, or a combination thereof.

5. The method of claim 1, wherein the hierarchical human and crowd feature data includes crowd level features, crowd components, individual person features, and audio features.

6. The method of claim 4, wherein the generating the crowd feature data includes building a multiple reference image background model using day night detection and ground plane calibration.

7. The method of claim 6, wherein the generating crowd level features includes at least one of a hybrid human detector comprising a multiple learning based human detector using an interleaving scanning method, texture analysis using fusion thereby generating crowd density, crowd count, crowd location, crowd size, and optical flow analysis for the crowd dynamics and motion features, thereby providing accurate human localization and crowd density estimation.

8. The method of claim 7, wherein the hybrid human detector comprising multiple learning based human detector comprises at least one of an Adaboost algorithm, a convolutional neural network, or a combination thereof, wherein the Adaboost or convolutional algorithm comprises at least one of a human head detector, a upper body detector, a full body detector, or a combination thereof.

9. The method of claim 8, wherein the individual people feature data includes one or more of coarse level feature data, multiple hypothesis tracking data thereby generating tracking results comprised of people tracking and multiple hypothesis tracking data, and wherein the tracking results are used to get bidirectional count and speed features for user defined counting lines.

10. The method of claim 2, further comprising the step of: controlling a camera field of view using the behavior, generating a human perceivable indication of the behavior, or a combination thereof.

11. The method of claim 2, further comprising the step of using the identification of an individual person and displaying the path of a person over time within a video scene.

12. One or more processor readable storage devices having processor readable code embodied on the processor readable devices for programming one or more processors to perform the method of claim 1.

13. The one or more devices of claim 12, wherein the readable storage devices are further configured to perform the steps:
   receiving sensor data, wherein the sensor data is at least one of a GPS data, location, weather data, date data, and time data; and
   wherein the generating hierarchical human and crowd feature data from the video data includes processing the sensor data.

* * * * *